US012750192B2

(12) United States Patent
Liu et al.

(10) Patent No.: US 12,750,192 B2
(45) Date of Patent: Sep. 29, 2026

(54) RESOURCE PROCESSING METHOD, APPARATUS, AND SYSTEM, AND STORAGE MEDIUM

(71) Applicant: Huawei Technologies Co., Ltd., Shenzhen (CN)

(72) Inventors: Yun Liu, Shenzhen (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 629 days.

(21) Appl. No.: 18/254,013

(22) PCT Filed: Nov. 23, 2021

(86) PCT No.: PCT/CN2021/132430
§ 371 (c)(1),
(2) Date: May 23, 2023

(87) PCT Pub. No.: WO2022/111470
PCT Pub. Date: Jun. 2, 2022

(65) Prior Publication Data

US 2024/0097858 A1 Mar. 21, 2024

(30) Foreign Application Priority Data

Nov. 24, 2020 (CN) ......................... 202011333838.4
Jan. 8, 2021 (CN) ......................... 202110023436.2

(51) Int. Cl.
*H04W 72/25* (2023.01)
*H04L 5/00* (2006.01)

(52) U.S. Cl.
CPC .......... *H04L 5/0055* (2013.01); *H04L 5/0094* (2013.01); *H04W 72/25* (2023.01)

(58) Field of Classification Search
USPC .... 370/229, 230.1, 236, 241, 252, 328, 329, 370/330, 431, 436, 458, 468
See application file for complete search history.

(56) References Cited

U.S. PATENT DOCUMENTS

| | | | | |
|---|---|---|---|---|
| 11,974,362 | B2 * | 4/2024 | Zhao | H04W 24/10 |
| 2015/0180631 | A1 * | 6/2015 | Zhang | H04L 5/0048 370/329 |
| 2018/0376525 | A1 | 12/2018 | Feng | |
| 2020/0220694 | A1 * | 7/2020 | Khoryaev | H04W 28/04 |
| 2020/0351032 | A1 | 11/2020 | Wu et al. | |
| 2021/0219320 | A1 * | 7/2021 | Belleschi | H04W 72/20 |
| 2021/0250931 | A1 * | 8/2021 | Yang | H04W 72/20 |
| 2022/0015186 | A1 * | 1/2022 | Jeong | H04L 1/1896 |
| 2022/0360409 | A1 * | 11/2022 | Yang | H04W 72/20 |

FOREIGN PATENT DOCUMENTS

| | | | |
|---|---|---|---|
| CN | 111865505 | A | 10/2020 |
| WO | 2020180032 | A1 | 9/2020 |
| WO | 2020192425 | A1 | 10/2020 |

* cited by examiner

*Primary Examiner* — Nguyen H Ngo
(74) *Attorney, Agent, or Firm* — Slater Matsil, LLP

(57) ABSTRACT

The method includes: sending first resource information on a first sidelink transmission channel, where the first resource information indicates a first resource; and receiving indication information on a second sidelink transmission channel, where the indication information indicates at least one second resource in the first resource; or receiving data sent on a second resource, where the second resource is determined based on the first resource.

19 Claims, 7 Drawing Sheets

RESOURCE PROCESSING METHOD, APPARATUS, AND SYSTEM, AND STORAGE MEDIUM

CROSS-REFERENCE TO RELATED APPLICATIONS

This application is a national stage of International Application No. PCT/CN2021/132430, filed on Nov. 23, 2021, which claims priority to Chinese Patent Application No. 202110023436.2, filed on Jan. 8, 2021 and Chinese Patent Application No. 202011333838.4, filed on Nov. 24, 2020. All of the aforementioned patent applications are hereby incorporated by reference in their entireties.

TECHNICAL FIELD

This application relates to the field of communication technologies, and in particular, to a resource processing method, apparatus, and system, and a storage medium.

BACKGROUND

In a vehicle to everything (Vehicle to Everything, V2X) technology, a vehicle-mounted device and another device (for example, another vehicle-mounted device or a roadside infrastructure) may perform direct communication with each other through a sidelink (sidelink). The direct communication has features such as a short delay and low overheads.

In a related technology, in a process in which a first device and a second device perform sidelink communication, the second device senses a frequency spectrum occupation status; the second device sends resource information to the first device, where the resource information includes a resource obtained through sensing; and the first device selects, based on the resource information, a resource used for transmission.

However, in the foregoing method, the resource information sent by the second device is redundant to some extent, the resource included in the resource information is not necessarily an idle resource of the first device, and accuracy and feedback efficiency of the resource information that is fed back are low.

SUMMARY

In view of this, a resource processing method, apparatus, and system, and a storage medium are proposed. In embodiments of this application, first resource information indicating a first resource is sent, so that a peer device determines at least one second resource in the first resource, thereby subsequently sending indication information indicating the at least one second resource or sending data on the determined second resource. This improves accuracy and feedback efficiency of resource information that is fed back.

According to a first aspect, an embodiment of this application provides a resource processing method, where the method includes:

- sending first resource information on a first sidelink transmission channel, where the first resource information indicates a first resource; and
- receiving indication information on a second sidelink transmission channel, where the indication information indicates at least one second resource in the first resource; or receiving data sent on a second resource, where the second resource is determined based on the first resource.

In this implementation, the first resource information indicating the first resource is sent on the first sidelink transmission channel, so that a peer device determines the second resource based on the first resource. The peer device may send, on the second sidelink transmission channel, the indication information indicating the at least one second resource, or may directly send the data on the determined second resource. Because the second resource is determined based on the first resource, a case in which a resource included in resource information is not necessarily an idle resource of a first device in a related technology is avoided, accuracy of the resource information that is fed back is ensured, and feedback efficiency of the resource information is effectively improved.

With reference to the first aspect, in a first possible implementation of the first aspect, the indication information includes a code domain resource, and the code domain resource corresponds to the at least one second resource.

In this implementation, the indication information of the second resource includes the code domain resource, and the code domain resource corresponds to the at least one second resource, so that when one code domain resource is fed back, a second device can determine at least one second resource corresponding to the code domain resource. This ensures reliability and effectiveness of an indication manner of the second resource.

With reference to the first aspect, in a second possible implementation of the first aspect, after the receiving indication information on a second sidelink transmission channel, the method further includes:

- determining, in the at least one second resource, a resource used for sending.

In this implementation, after receiving, on the second sidelink transmission channel, the indication information indicating the at least one second resource, the first device determines, in the at least one second resource, the resource used for sending, so that the resource used for sending is a resource that is idle in both the first device and a second device. This reduces a probability of interference in a data transmission process, and ensures a data transmission effect.

With reference to the first aspect, in a third possible implementation of the first aspect, an upper limit value of a quantity of first resources and/or the quantity of first resources are/is predefined in a protocol, or are/is preconfigured by using configuration information.

In this implementation, the upper limit value of the quantity of first resources and/or the quantity of first resources may be predefined in the protocol, or may be preconfigured by using the configuration information, so that the first device and a second device pre-determine the upper limit value of the quantity of first resources and/or the quantity of first resources before transmission of the first resource information.

With reference to any one of the first aspect or the first possible implementation to the third possible implementation of the first aspect, in a fourth possible implementation of the first aspect, the first resource information further indicates a first quantity, where the first quantity includes the quantity of first resources, or the first quantity includes at least one of a quantity of time domain windows that corresponds to the first resource, a quantity of frequency domain windows that corresponds to the first resource, a quantity that is of first bitmaps indicating time domain resources and that corresponds to the first resource, or a quantity that is of second bitmaps indicating frequency domain resources and that corresponds to the first resource.

In this implementation, the first quantity (including the quantity of first resources, or including at least one of the quantity of time domain windows that corresponds to the first resource, the quantity of frequency domain windows that corresponds to the first resource, the quantity that is of first bitmaps indicating time domain resources and that corresponds to the first resource, or the quantity that is of second bitmaps indicating frequency domain resources and that corresponds to the first resource) may further be indicated by the first resource information, so that the second device can determine quantity information related to the first resource.

With reference to the fourth possible implementation of the first aspect, in a fifth possible implementation of the first aspect, the first quantity in the first resource information or a first parameter associated with the first quantity is in first-stage sidelink control information (sidelink control information, SCI), time domain resource information and frequency domain resource information of the first resource in the first resource information are in second-stage SCI, and the method further includes:

determining, based on the first quantity or the first parameter, a quantity of bits occupied by the second-stage SCI.

In this implementation, the first device indicates the first quantity by using the first-stage SCI, determines, based on the first quantity or the first parameter in the first-stage SCI, the quantity of bits occupied by the second-stage SCI, and indicates the first resource by using the second-stage SCI. This provides a possible manner of indicating the first quantity and the first resource.

With reference to the fourth possible implementation of the first aspect, in a sixth possible implementation of the first aspect, the first quantity in the first resource information or a first parameter associated with the first quantity is in second-stage SCI, time domain resource information and frequency domain resource information of the first resource in the first resource information are in third-stage SCI, and the method further includes:

determining, based on the first quantity or the first parameter, a quantity of bits occupied by the third-stage SCI.

In this implementation, the first device indicates the first quantity by using the second-stage SCI, determines, based on the first quantity or the first parameter in the second-stage SCI, the quantity of bits occupied by the third-stage SCI, and indicates the first resource by using the third-stage SCI. This provides another possible manner of indicating the first quantity and the first resource.

With reference to the fourth possible implementation of the first aspect, in a seventh possible implementation of the first aspect, time domain resource information and frequency domain resource information of the first resource in the first resource information are in third-stage SCI, and second-stage SCI indicates a quantity of bits occupied by the third-stage SCI.

In this implementation, the first device indicates, by using the second-stage SCI, the quantity of bits occupied by the third-stage SCI, and indicates the first resource by using the third-stage SCI. This provides another possible manner of indicating the first resource.

With reference to any one of the first aspect or the first possible implementation to the seventh possible implementation of the first aspect, in an eighth possible implementation of the first aspect, the first resource information includes the time domain resource information and the frequency domain resource information, the time domain resource information indicates a time domain resource corresponding to the first resource, and the frequency domain resource information indicates a frequency domain resource corresponding to the first resource.

In this implementation, the first resource information sent by the first device on the first sidelink transmission channel includes the time domain resource information indicating the time domain resource corresponding to the first resource and the frequency domain resource information indicating the frequency domain resource corresponding to the first resource. This ensures effectiveness of carrying the first resource by the first sidelink transmission channel.

With reference to the eighth possible implementation of the first aspect, in a ninth possible implementation of the first aspect, the time domain resource information includes a time domain resource range of the first resource, the frequency domain resource information includes a first identifier, and the first identifier indicates a frequency domain resource range corresponding to the first resource.

In this implementation, the first resource is indicated in dimensions of a time domain and a frequency domain. That is, a possible indication manner in which the first resource information indicates the first resource is provided. This improves diversity and flexibility of a manner in which the first sidelink transmission channel carries the first resource.

With reference to the eighth possible implementation of the first aspect, in a tenth possible implementation of the first aspect, the time domain resource information includes information about the time domain window or the first bitmap, where the information about the time domain window includes at least two of a time domain start position, time domain duration, or a time domain end position of the first resource, and the first bitmap indicates the time domain resources that are in the first resources and that are continuously or discontinuously distributed.

In this implementation, the time domain resources are indicated by the information about the time domain window or the first bitmap. That is, two possible manners of indicating the time domain resources in the first resources are provided. This improves diversity and flexibility of a time domain resource indication manner.

With reference to the eighth possible implementation of the first aspect, in an eleventh possible implementation of the first aspect, the frequency domain resource information includes information about the frequency domain window or the second bitmap, where the information about the frequency domain window includes at least two of a frequency domain start subchannel, a quantity of continuous subchannels, and a frequency domain end subchannel of the first resource, and the second bitmap indicates the frequency domain resources that are in the first resources and that are continuously or discontinuously distributed.

In this implementation, the frequency domain resources are indicated by the information about the frequency domain window or the second bitmap. That is, two possible manners of indicating the frequency domain resources in the first resources are provided. This improves diversity and flexibility of a frequency domain resource indication manner.

With reference to the tenth possible implementation or the eleventh possible implementation of the first aspect, in a twelfth possible implementation of the first aspect, the method further includes:

receiving configuration information, where the configuration information indicates a window size range of the time domain window and/or a window size range of the frequency domain window.

In this implementation, the first device receives the configuration information, where the configuration information indicates the window size range of the time domain window and/or the window size range of the frequency domain window, so that the first device and the second device pre-determine the window size range of the time domain window and/or the window size range of the frequency domain window before the transmission of the first resource information.

With reference to any one of the first aspect or the first possible implementation to the twelfth possible implementation of the first aspect, in a thirteenth possible implementation of the first aspect, the receiving indication information on a second sidelink transmission channel includes:

receiving first signaling on the second sidelink transmission channel, where the first signaling includes the indication information and second information, and the second information includes acknowledgement (Acknowledgement, ACK) information or negative acknowledgement (Negative Acknowledgement, NACK) information; or receiving second signaling and third signaling on the second sidelink transmission channel, where the second signaling includes the indication information, and the third signaling includes ACK information or NACK information.

In this implementation, a feedback manner of the ACK information or the NACK information and the indication information of the second resource is refined. In one feedback manner, the first device receives the second signaling and the third signaling on the second sidelink transmission channel, where the second signaling includes the indication information, and the third signaling includes the ACK information or the NACK information. That is, the ACK information or the NACK information and the indication information of the second resource are separately indicated, and the second device needs to occupy at least two code domain resources on the second sidelink transmission channel. In the other feedback manner, the first device receives the first signaling on the second sidelink transmission channel, where the first signaling includes the indication information and the second information, and the second information includes the ACK information or the NACK information. That is, the ACK information or the NACK information and the indication information of the second resource are jointly encoded, one code domain resource on the second sidelink transmission channel is occupied, and both the ACK information or the NACK information and the indication information of the determined second resource may be indicated. This reduces unnecessary resource overheads.

With reference to any one of the first aspect or the first possible implementation to the twelfth possible implementation of the first aspect, in a fourteenth possible implementation of the first aspect, the first sidelink transmission channel is a physical sidelink shared channel (Physical Sidelink Shared Channel, PSSCH), and the second sidelink transmission channel is a physical sidelink feedback channel (Physical Sidelink Feedback Channel, PSFCH).

In this implementation, the PSSCH carries the first resource information indicating the first resource, and the PSFCH carries the indication information indicating the at least one second resource in the first resource, so that a PSSCH resource that is subsequently determined by the first device in the at least one second resource and that is used for sending is a resource that is idle in both the first device and the second device, and a data transmission effect is ensured.

According to a second aspect, an embodiment of this application provides a resource processing method, where the method includes:

receiving first resource information on a first sidelink transmission channel, where the first resource information indicates a first resource; and sending indication information on a second sidelink transmission channel, where the indication information indicates at least one second resource in the first resource; or sending data on a second resource, where the second resource is determined based on the first resource.

With reference to the second aspect, in a first possible implementation of the second aspect, the indication information includes a code domain resource, and the code domain resource corresponds to the at least one second resource.

With reference to the second aspect, in a second possible implementation of the second aspect, an upper limit value of a quantity of first resources and/or the quantity of first resources are/is predefined in a protocol, or are/is preconfigured by using configuration information.

With reference to the second aspect, the first possible implementation of the second aspect, or the second possible implementation of the second aspect, in a third possible implementation of the second aspect, the first resource information further indicates a first quantity, where the first quantity includes the quantity of first resources, or the first quantity includes at least one of a quantity of time domain windows that corresponds to the first resource, a quantity of frequency domain windows that corresponds to the first resource, a quantity that is of first bitmaps indicating time domain resources and that corresponds to the first resource, or a quantity that is of second bitmaps indicating frequency domain resources and that corresponds to the first resource.

With reference to the third possible implementation of the second aspect, in a fourth possible implementation of the second aspect, the first quantity in the first resource information or a first parameter associated with the first quantity is in first-stage SCI, time domain resource information and frequency domain resource information of the first resource in the first resource information are in second-stage SCI, and the method further includes: determining, based on the first quantity or the first parameter, a quantity of bits occupied by the second-stage SCI.

With reference to the third possible implementation of the second aspect, in a fifth possible implementation of the second aspect, the first quantity in the first resource information or a first parameter associated with the first quantity is in second-stage SCI, time domain resource information and frequency domain resource information of the first resource in the first resource information are in third-stage SCI, and the method further includes:

determining, based on the first quantity or the first parameter, a quantity of bits occupied by the third-stage SCI.

With reference to the second aspect, in a seventh possible implementation of the second aspect, time domain resource information and frequency domain resource information of the first resource in the first resource information are in third-stage SCI, and second-stage SCI indicates a quantity of bits occupied by the third-stage SCI.

With reference to the seventh possible implementation of the second aspect, in an eighth possible implementation of the second aspect, the time domain resource information includes a time domain resource range of the first resource, the frequency domain resource information includes a first identifier, and the first identifier indicates a frequency domain resource range corresponding to the first resource.

With reference to the eighth possible implementation of the second aspect, in a ninth possible implementation of the second aspect, the time domain resource information includes information about a time domain window or a first bitmap, where the information about the time domain window includes at least two of a time domain start position, time domain duration, or a time domain end position of the first resource, and the first bitmap indicates time domain resources that are in first resources and that are continuously or discontinuously distributed.

With reference to the eighth possible implementation of the second aspect, in a tenth possible implementation of the second aspect, the frequency domain resource information includes information about a frequency domain window or a second bitmap, where the information about the frequency domain window includes at least two of a frequency domain start subchannel, a quantity of continuous subchannels, or a frequency domain end subchannel of the first resource, and the second bitmap indicates frequency domain resources that are in first resources and that are continuously or discontinuously distributed.

With reference to the ninth possible implementation or the tenth possible implementation of the second aspect, in an eleventh possible implementation of the second aspect, the method further includes:

receiving configuration information, where the configuration information indicates a window size range of the time domain window and/or a window size range of the frequency domain window.

With reference to any one of the second aspect or the first possible implementation to the eleventh possible implementation of the second aspect, in a twelfth possible implementation of the second aspect, the sending indication information on a second sidelink transmission channel includes:

sending first signaling on the second sidelink transmission channel, where the first signaling includes the indication information and second information, and the second information includes ACK information or NACK information; or sending second signaling and third signaling on the second sidelink transmission channel, where the second signaling includes the indication information, and the third signaling includes ACK information or NACK information.

With reference to any one of the second aspect or the first possible implementation to the eleventh possible implementation of the second aspect, in a thirteenth possible implementation of the second aspect, the first sidelink transmission channel is a PSSCH, and the second sidelink transmission channel is a PSFCH.

According to a third aspect, a resource processing apparatus is provided, where the apparatus includes at least one unit, and the at least one unit is configured to implement the resource processing method according to any one of the first aspect or the possible implementations of the first aspect.

According to a fourth aspect, a resource processing apparatus is provided, where the apparatus includes at least one unit, and the at least one unit is configured to implement the resource processing method according to any one of the second aspect or the possible implementations of the second aspect.

According to a fifth aspect, an embodiment of this application provides a resource processing apparatus, where the apparatus includes: a processor and a memory configured to store processor-executable instructions, and the processor is configured to:

send first resource information on a first sidelink transmission channel, where the first resource information indicates a first resource; and receive indication information on a second sidelink transmission channel, where the indication information indicates at least one second resource in the first resource; or receive data sent on a second resource, where the second resource is determined based on the first resource.

With reference to the fifth aspect, in a first possible implementation of the fifth aspect, the indication information includes a code domain resource, and the code domain resource corresponds to the at least one second resource.

With reference to the fifth aspect, in a second possible implementation of the fifth aspect, the processor is further configured to:

determine, in the at least one second resource, a resource used for sending.

With reference to the fifth aspect, in a third possible implementation of the fifth aspect, an upper limit value of a quantity of first resources and/or the quantity of first resources are/is predefined in a protocol, or are/is preconfigured by using configuration information.

With reference to any one of the fifth aspect or the first possible implementation to the third possible implementation of the fifth aspect, in a fourth possible implementation of the fifth aspect, the first resource information further indicates a first quantity, where the first quantity includes the quantity of first resources, or the first quantity includes at least one of a quantity of time domain windows that corresponds to the first resource, a quantity of frequency domain windows that corresponds to the first resource, a quantity that is of first bitmaps indicating time domain resources and that corresponds to the first resource, or a quantity that is of second bitmaps indicating frequency domain resources and that corresponds to the first resource.

With reference to the fourth possible implementation of the fifth aspect, in a fifth possible implementation of the fifth aspect, the first quantity in the first resource information or a first parameter associated with the first quantity is in first-stage SCI, time domain resource information and frequency domain resource information of the first resource in the first resource information are in second-stage SCI, and the processor is further configured to:

determine, based on the first quantity or the first parameter, a quantity of bits occupied by the second-stage SCI.

With reference to the fourth possible implementation of the fifth aspect, in a sixth possible implementation of the fifth aspect, the first quantity in the first resource information or a first parameter associated with the first quantity is in second-stage SCI, time domain resource information and frequency domain resource information of the first resource in the first resource information are in third-stage SCI, and the processor is further configured to: determine, based on the first quantity or the first parameter, a quantity of bits occupied by the third-stage SCI.

With reference to the fourth possible implementation of the fifth aspect, in a seventh possible implementation of the fifth aspect, time domain resource information and frequency domain resource information of the first resource in the first resource information are in third-stage SCI, and second-stage SCI indicates a quantity of bits occupied by the third-stage SCI.

With reference to any one of the fifth aspect or the first possible implementation to the seventh possible implementation of the fifth aspect, in an eighth possible implementation of the fifth aspect, the first resource information includes the time domain resource information and the frequency domain resource information, the time domain resource information indicates a time domain resource corresponding to the first resource, and the frequency domain resource information indicates a frequency domain resource corresponding to the first resource.

With reference to the eighth possible implementation of the fifth aspect, in a ninth possible implementation of the fifth aspect, the time domain resource information includes a time domain resource range of the first resource, the frequency domain resource information includes a first identifier, and the first identifier indicates a frequency domain resource range corresponding to the first resource.

With reference to the eighth possible implementation of the fifth aspect, in a tenth possible implementation of the fifth aspect, the time domain resource information includes information about the time domain window or the first bitmap, where the information about the time domain window includes at least two of a time domain start position, time domain duration, or a time domain end position of the first resource, and the first bitmap indicates the time domain resources that are in the first resources and that are continuously or discontinuously distributed.

With reference to the eighth possible implementation of the fifth aspect, in an eleventh possible implementation of the fifth aspect, the frequency domain resource information includes information about the frequency domain window or the second bitmap, where the information about the frequency domain window includes at least two of a frequency domain start subchannel, a quantity of continuous subchannels, and a frequency domain end subchannel of the first resource, and the second bitmap indicates the frequency domain resources that are in the first resources and that are continuously or discontinuously distributed.

With reference to the tenth possible implementation or the eleventh possible implementation of the fifth aspect, in a twelfth possible implementation of the fifth aspect, the processor is further configured to:

receive configuration information, where the configuration information indicates a window size range of the time domain window and/or a window size range of the frequency domain window.

With reference to any one of the fifth aspect or the first possible implementation to the twelfth possible implementation of the fifth aspect, in a thirteenth possible implementation of the fifth aspect, the processor is further configured to:

receive first signaling on the second sidelink transmission channel, where the first signaling includes the indication information and second information, and the second information includes ACK information or NACK information; or receive second signaling and third signaling on the second sidelink transmission channel, where the second signaling includes the indication information, and the third signaling includes ACK information or NACK information.

With reference to any one of the fifth aspect or the first possible implementation to the twelfth possible implementation of the fifth aspect, in a fourteenth possible implementation of the fifth aspect, the first sidelink transmission channel is a PSSCH, and the second sidelink transmission channel is a PSFCH.

According to a sixth aspect, an embodiment of this application provides a resource processing apparatus, where the apparatus includes: a processor and a memory configured to store processor-executable instructions, and the processor is configured to:

receive first resource information on a first sidelink transmission channel, where the first resource information indicates a first resource; and send indication information on a second sidelink transmission channel, where the indication information indicates at least one second resource in the first resource; or send data on a second resource, where the second resource is determined based on the first resource. With reference to the sixth aspect, in a first possible implementation of the sixth aspect, the indication information includes a code domain resource, and the code domain resource corresponds to the at least one second resource.

With reference to the sixth aspect, in a second possible implementation of the sixth aspect, an upper limit value of a quantity of first resources and/or the quantity of first resources are/is predefined in a protocol, or are/is preconfigured by using configuration information.

With reference to the sixth aspect, the first possible implementation of the sixth aspect, or the second possible implementation of the sixth aspect, in a third possible implementation of the sixth aspect, the first resource information further indicates a first quantity, where the first quantity includes the quantity of first resources, or the first quantity includes at least one of a quantity of time domain windows that corresponds to the first resource, a quantity of frequency domain windows that corresponds to the first resource, a quantity that is of first bitmaps indicating time domain resources and that corresponds to the first resource, or a quantity that is of second bitmaps indicating frequency domain resources and that corresponds to the first resource.

With reference to the third possible implementation of the sixth aspect, in a fourth possible implementation of the sixth aspect, the first quantity in the first resource information or a first parameter associated with the first quantity is in first-stage SCI, time domain resource information and frequency domain resource information of the first resource in the first resource information are in second-stage SCI, and the processor is further configured to:

determine, based on the first quantity or the first parameter, a quantity of bits occupied by the second-stage SCI.

With reference to the third possible implementation of the sixth aspect, in a fifth possible implementation of the sixth aspect, the first quantity in the first resource information or a first parameter associated with the first quantity is in second-stage SCI, time domain resource information and frequency domain resource information of the first resource in the first resource information are in third-stage SCI, and the processor is further configured to: determine, based on the first quantity or the first parameter, a quantity of bits occupied by the third-stage SCI.

With reference to the sixth aspect, in a seventh possible implementation of the sixth aspect, time domain resource information and frequency domain resource information of the first resource in the first resource information are in third-stage SCI, and second-stage SCI indicates a quantity of bits occupied by the third-stage SCI.

With reference to the seventh possible implementation of the sixth aspect, in an eighth possible implementation of the sixth aspect, the time domain resource information includes a time domain resource range of the first resource, the frequency domain resource information includes a first identifier, and the first identifier indicates a frequency domain resource range corresponding to the first resource.

With reference to the eighth possible implementation of the sixth aspect, in a ninth possible implementation of the sixth aspect, the time domain resource information includes information about a time domain window or a first bitmap, where the information about the time domain window includes at least two of a time domain start position, time domain duration, or a time domain end position of the first resource, and the first bitmap indicates time domain resources that are in first resources and that are continuously or discontinuously distributed.

With reference to the eighth possible implementation of the sixth aspect, in a tenth possible implementation of the sixth aspect, the frequency domain resource information includes information about a frequency domain window or a second bitmap, where the information about the frequency domain window includes at least two of a frequency domain start subchannel, a quantity of continuous subchannels, or a frequency domain end subchannel of the first resource, and the second bitmap indicates frequency domain resources that are in first resources and that are continuously or discontinuously distributed.

With reference to the ninth possible implementation or the tenth possible implementation of the sixth aspect, in an eleventh possible implementation of the sixth aspect, the method further includes:

receive configuration information, where the configuration information indicates a window size range of the time domain window and/or a window size range of the frequency domain window.

With reference to any one of the sixth aspect or the first possible implementation to the eleventh possible implementation of the sixth aspect, in a twelfth possible implementation of the sixth aspect, the processor is further configured to:

send first signaling on the second sidelink transmission channel, where the first signaling includes the indication information and second information, and the second information includes ACK information or NACK information; or send second signaling and third signaling on the second sidelink transmission channel, where the second signaling includes the indication information, and the third signaling includes ACK information or NACK information.

With reference to any one of the sixth aspect or the first possible implementation to the eleventh possible implementation of the sixth aspect, in a thirteenth possible implementation of the sixth aspect, the first sidelink transmission channel is a PSSCH, and the second sidelink transmission channel is a PSFCH.

According to a seventh aspect, an embodiment of this application provides a computer program product, including computer-readable code or a non-volatile computer-readable storage medium carrying the computer-readable code. When the computer-readable code is run in an electronic device, a processor in the electronic device performs the resource processing method according to any one of the first aspect or the possible implementations of the first aspect.

According to an eighth aspect, an embodiment of this application provides a computer program product, including computer-readable code or a non-volatile computer-readable storage medium carrying the computer-readable code. When the computer-readable code is run in an electronic device, a processor in the electronic device performs the resource processing method according to any one of the second aspect or the possible implementations of the second aspect.

According to a ninth aspect, an embodiment of this application provides a non-volatile computer-readable storage medium, storing computer program instructions. When the computer program instructions are executed by a processor, the resource processing method according to any one of the first aspect or the possible implementations of the first aspect is implemented.

According to a tenth aspect, an embodiment of this application provides a non-volatile computer-readable storage medium, storing computer program instructions. When the computer program instructions are executed by a processor, the resource processing method according to any one of the second aspect or the possible implementations of the second aspect is implemented.

According to an eleventh aspect, an embodiment of this application provides a resource processing system. The resource processing system includes a first device and a second device. The first device is configured to perform the resource processing method according to any one of the first aspect or the possible implementations of the first aspect. The second device is configured to perform the resource processing method according to any one of the second aspect or the possible implementations of the second aspect.

BRIEF DESCRIPTION OF DRAWINGS

Accompanying drawings included in the specification and constructing a part of the specification and this specification jointly show the example embodiments, features, and aspects of this application, and are intended to explain the principles of this application.

DESCRIPTION OF EMBODIMENTS

The following describes various example embodiments, features, and aspects of this application in detail with reference to the accompanying drawings. Identical reference signs in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment, or illustration". Any embodiment described as "example" is not necessarily explained as being superior or better than other embodiments.

In addition, to better describe this application, numerous specific details are given in the following specific implementations. A person skilled in the art should understand that this application can also be implemented without some specific details. In some instances, methods, means, elements, and circuits that are well-known to a person skilled in the art are not described in detail, so that the subject matter of this application is highlighted.

Figure 1:
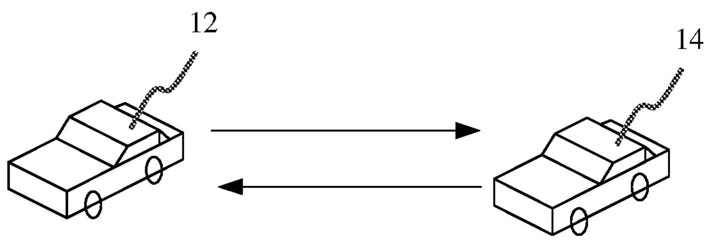
FIG. 1 is a schematic diagram of a unicast communication scenario according to an example embodiment.
Figure 2:
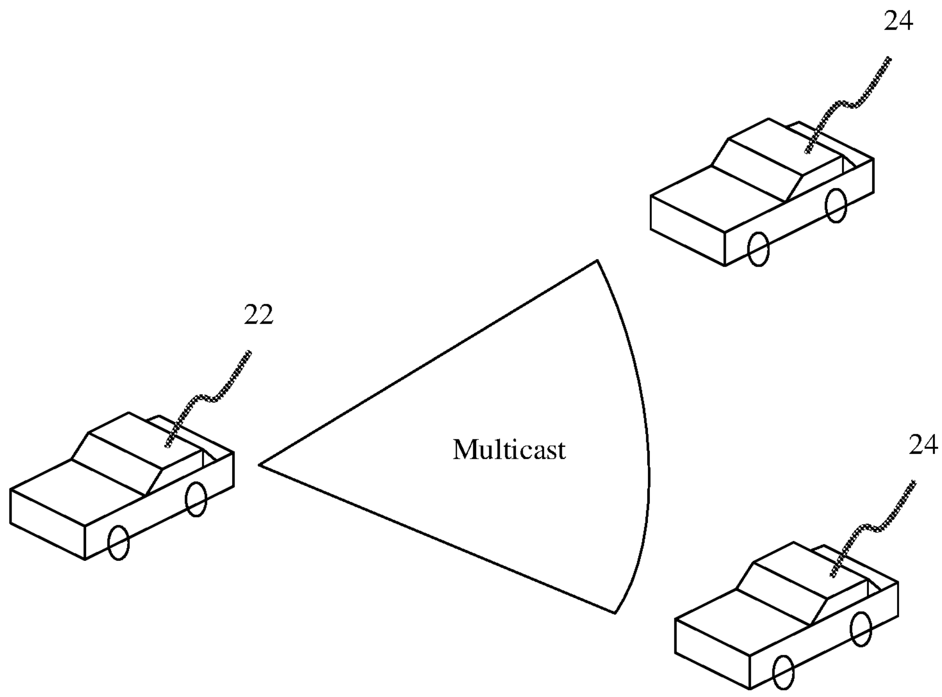
FIG. 2 is a schematic diagram of a multicast communication scenario according to an example embodiment.

With evolution of communication technologies, 3GPP introduces support for vehicle-to-vehicle (Vehicle-to-Vehicle, V2V) and V2X services into long term evolution (Long Term Evolution, LTE) in Rel-14 and Rel-15, to extend a 3GPP platform to an automotive industry. In R16, related designs of new radio (New Radio, NR) V2X are researched. In these designs, two main communication scenarios are discussed. For example, user equipments (User Equipments, UEs) that communicate with each other are both vehicles. The two main communication scenarios are shown in FIG. 1 and FIG. 2. FIG. 1 is a schematic diagram of a unicast communication scenario according to an example embodiment. A first device 12 (for example, a UE-A) and a second device 14 (for example, a UE-B) perform point-to-point communication. FIG. 2 is a schematic diagram of a multicast communication scenario according to an example embodiment. A sending end device 22 (for example, a Tx UE) performs multicast communication with one or more receiving end devices 24 (for example, an Rx UE). That is, the sending end device 22 sends data to the one or more receiving end devices 24 on a PSSCH. After receiving the data, each receiving end device 24 determines, based on a decoding result and a transmission mode, whether to feed back ACK information or NACK information to the sending end device 22.

A V2X feedback channel is a PSFCH. Different sequences are used for the PSFCH on one physical resource block (Physical Resource Block, PRB) by using a sequence of a physical uplink control channel (Physical Uplink Control Channel, PUCCH) format (format) 0 in 5G NR as a reference, to identify different meanings. With reference to the sequence of the PUCCH format 0, sequences of different cyclic shifts (cyclic shifts, CSs) may be orthogonal to each other. Therefore, depending on the different cyclic shifts, sequence code division may be enabled to occupy a same time-frequency resource. The cyclic shift involves at least two parameters, for example, $m_o$ and $m_{cs}$, related to a UE that sends the PSFCH. $m_o$ indicates whether transferred information is the ACK information or the NACK information. The information occupies one bit, and has two possible values. $m_{cs}$ is a parameter determined by the UE, and is for implementing code division. Therefore, one code domain resource of the PSFCH may be determined by determining the two parameters $m_o$ and $m_{cs}$. $m_{cs}$ is an integer that is not greater than a sequence length. For example, if the sequence length is 12, a value range is 0 to 11.

The PSFCH may be for feeding back the ACK information or the NACK information in the unicast communication scenario, or may be for feeding back the ACK information or the NACK information in the multicast communication scenario. Multicast transmission is limited to only one group. This is different from that one UE sends broadcast messages to all other UEs. To improve reliability of intra-group transmission, UEs that receive multicast messages feed back decoding results based on demodulation statuses, that is, feed back the NACK information or the ACK information. When one UE feeds back the NACK information, it indicates that multicast transmission fails, and retransmission is needed. In consideration of particularity of a multicast feedback, two multicast feedback mechanisms, namely, a manner 1 and a manner 2, are specified in a standard research phase. In the manner 1, all UEs that receive the multicast messages feed back the NACK information by using a same resource, and do not feed back the ACK information. A UE that sends the multicast messages receives energy on a detection feedback resource, and determines whether a UE feeds back the NACK information, thereby determining whether to perform retransmission. In the manner 2, each UE that receives the multicast messages has two independent feedback resources, where one feedback resource corresponds to the ACK information, and the other feedback resource corresponds to the NACK information. When multicast receiving succeeds, the UE feeds back the ACK information. When multicast receiving fails, the UE feeds back the NACK information. Because each UE has the feedback resources corresponding to the ACK and the NACK, when the UE that sends the multicast messages does not receive any feedback information corresponding to a UE that receives the multicast messages, it means that the UE does not detect transmission of the multicast messages.

Figure 3:
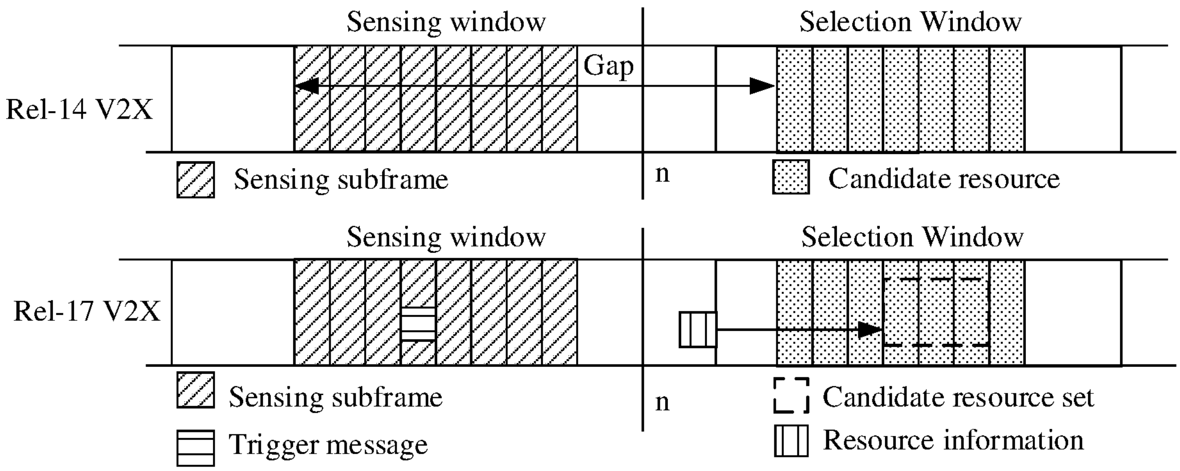
FIG. 3 is a schematic diagram of principles of sensing mechanisms in a related technology.

As shown in FIG. 3, a sensing mechanism is proposed in LTE Rel-14 V2X. At a moment n at which a transmission requirement is determined, a UE determines a sensing window (sensing window) that is before the moment n and a selection window (selection window). Duration between the sensing window and the selection window is a gap (gap). Because services of Rel-14 are all periodic services, and only several fixed values can be used for a periodicity, the gap is a parameter selected from the foregoing several fixed values. Detection is performed on resources in the sensing window. There may be no signal transmitted on some resources, and there is a signal transmitted on some resources. For the resource on which there is a signal transmitted, after signal strength is obtained and a periodicity of a service corresponding to the signal is obtained, interference strength caused when the service falls on a resource corresponding to the selection window may be estimated. If the interference strength is greater than a preset strength threshold, it is determined that the resource cannot be for subsequent resource transmission of the UE. According to the foregoing filtering rule, the UE obtains a resource set, and randomly selects, from the resource set, a resource used for transmission. In a process of information exchange between a first device (for example, a UE-A) and a second device (for example, a UE-B) in Rel-17V2X, the first device senses a frequency spectrum occupation status; the second device sends a trigger message (for example, a trigger subframe) to the first device, and the first device sends resource information to the second device after receiving the trigger message, where the resource information includes a candidate resource set obtained through sensing; and the second device selects, based on the resource information, a resource used for transmission. This is different from Rel-14 V2X. Therefore, the resource information of the first device is not used by the first device for transmission as in Rel-14 V2X, but is used by the second device for transmission.

In the foregoing method, resource information sent by the second device is redundant to some extent, a resource included in the resource information is not necessarily an idle resource of the first device, and the first device does not carry any related resource information when triggering information in a previous step. In addition, one time of transmission is added only to transfer the resource information, and overheads are quite high. However, in this case, there is not necessarily a requirement of transmitting the resource information. Because a channel changes in real time, and the resource information becomes invalid after a period of time, a resource waste is also caused.

Even if the transmission overheads of the resource information are acceptable for unicast transmission, for one time of multicast transmission, each receiving end device needs to feed back a recommended resource, the recommended resources are summarized to determine transmission resource overheads, the transmission resource overheads are in direct proportion to a quantity of devices in a multicast group, and the overheads are more difficult to control.

Embodiments of this application provide a resource processing method. A first device sends, on a first sidelink transmission channel, first resource information indicating a first resource, so that a second device determines a second resource based on the first resource. The second device may send, on a second sidelink transmission channel, indication information indicating at least one second resource, or may directly send data on the determined second resource. Because the second resource is determined based on the first resource, a case in which a resource included in resource information is not necessarily an idle resource of the first device in a related technology is avoided, accuracy of the resource information that is fed back is ensured, and feedback efficiency of the resource information is effectively improved.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

Figure 4:
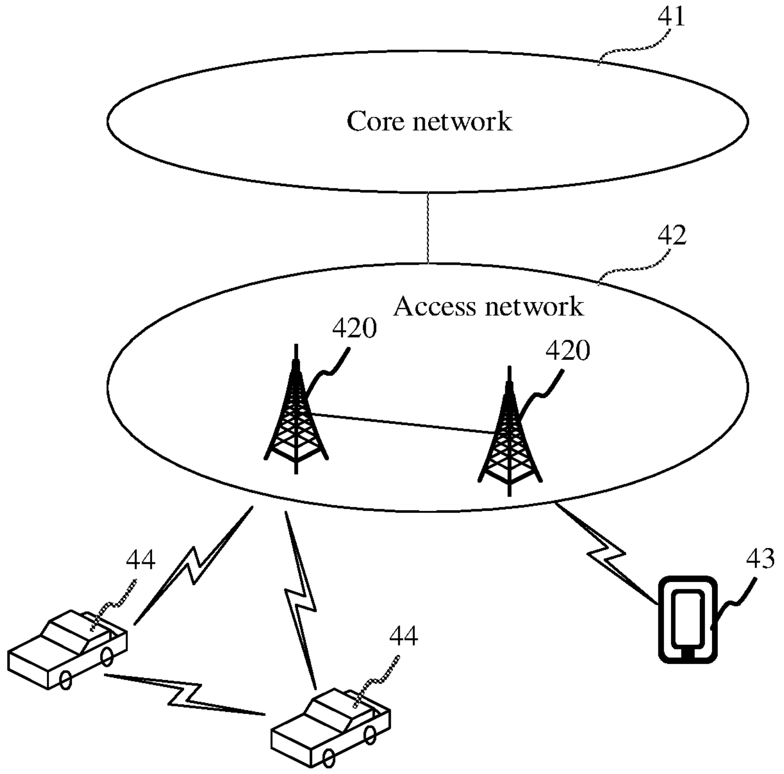
FIG. 4 is a schematic diagram of a network architecture to which an embodiment of this application may be applied.

FIG. 4 is a schematic diagram of a network architecture to which an embodiment of this application may be applied. The network architecture may be a network architecture of a C-V2X system. C refers to a cellular (English: Cellular), and the C-V2X system is an in-vehicle wireless communication system formed based on a cellular network communication system such as 3G, 4G, or 5G. The network architecture may include a core network 41, an access network 42, a terminal 43, and vehicles 44.

The core network 41 includes several core network devices. Main functions of the core network device are providing a user connection, managing a user, completing service carrying, and acting as a bearer network to provide an interface to an external network. For example, a core network of a long term evolution (Long Term Evolution, LTE) system may include devices such as a mobility management entity (Mobility Management Entity, MME), a serving gateway (Serving Gateway, S-GW), and a PDN gateway (PDN Gateway, P-GW). A core network of a 5G NR system may include devices such as an access and mobility management function (Access and Mobility Management Function, AMF) entity, a user plane function (User Plane Function, UPF) entity, and a session management function (Session Management Function, SMF) entity.

The access network 42 includes several access network devices 420. The access network device 420 may be a base station, and a remaining part of the access network 42 may include an Internet protocol (Internet Protocol, IP) network. The base station may further coordinate attribute management of an air interface. For example, the base station may be a base transceiver station (Base Transceiver Station, BTS) in GSM or CDMA, may be a NodeB (NodeB) in WCDMA, or may be an evolved NodeB (evolved NodeB, eNB or eNodeB) in LTE. In the 5G NR system, the base station is referred to as a gNodeB or a gNB. This is not limited in this embodiment of this application.

The terminal 43 may include various handheld devices, vehicle-mounted devices, wearable devices, or computing devices that have a wireless communication function, another processing device connected to a wireless modem, or the like. For example, the terminal 43 may be a device such as a personal communications service (Personal Communications Service, PCS) phone, a cordless phone, a session initiation protocol (SIP) phone, a wireless local loop (Wireless Local Loop, WLL) station, or a personal digital assistant (Personal Digital Assistant, PDA). The terminal may also be referred to as a subscriber unit (Subscriber Unit), a subscriber station (Subscriber Station), a mobile station (Mobile Station), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment). For ease of description, the devices mentioned above are collectively referred to as the terminal. The access network device 420 and the terminal 43 communicate with each other by using an air interface technology, for example, through a Uu interface.

The vehicle 44 may be a self-driving vehicle or a non-self-driving vehicle. The vehicle 44 has a vehicle-mounted device, and the vehicle 44 communicates with another vehicle, the terminal 43, or another device such as a road side unit (Road Side Unit, RSU) by using the vehicle-mounted device. The vehicle-mounted device may also be referred to as a vehicle-mounted terminal, a vehicle-mounted communication apparatus, or another name. This is not limited in this embodiment of this application.

The vehicle-mounted device of the vehicle 44 and another device (for example, another vehicle-mounted device, the terminal 43, or the RSU) may communicate with each other through a sidelink communication interface (for example, a PC5 interface). Accordingly, a communication link established based on the sidelink communication interface may be referred to as a sidelink or a direct link. In addition, the vehicle-mounted device of the vehicle 44 and the another device may further perform forwarding through the access network 42 and the core network 41, that is, communicate with each other by using a communication link between the terminal 43 and the access network device 420 in an original cellular network. Compared with communication that is based on the Uu interface, communication that is based on the sidelink communication interface has features such as a short delay and low overheads, and is suitable for communication between the vehicle-mounted device and another nearby device that is geographically close to the vehicle-mounted device.

The network architecture shown in FIG. 4 may implement a V2X service scenario. The network architecture may further include devices such as the RSU, a V2X application server, and a V2X control function node. This is not limited in embodiments of this application. In addition, the technical solutions described in embodiments of this application are applicable to the 5G NR system or a subsequent evolved system of the 5G NR system.

In embodiments of this application, a first device and a second device are devices at two ends that perform sidelink communication in vehicle to everything or another service scenario. A sidelink may be established between the first device and the second device through a sidelink communication interface (for example, a PC5 interface), and then user plane data and control plane signaling are exchanged through the sidelink.

For example, the first device may be the vehicle-mounted device of the vehicle 44 in the network architecture shown in FIG. 4, and the second device may be a vehicle-mounted device of the another vehicle, or may be the terminal 43, the RSU, or the like. For another example, the first device may be the terminal 43 in the network architecture shown in FIG. 4, and the second device may be another terminal, or may be the vehicle-mounted device of the vehicle 44, the RSU, or the like.

In some embodiments, for a same device (for example, a same vehicle-mounted device or a same terminal), the device may be used as a sidelink communication receiving end user equipment (which is also referred to as a receiving end device for short) in some scenarios, or may be used as a sidelink communication sending end user equipment (which is also referred to as a sending end device for short) in some other scenarios.

In embodiments of this application, for a sidelink communication process in the foregoing vehicle to everything or another service scenario, a resource processing method is provided, to resolve a problem that accuracy and feedback efficiency of resource information that is fed back are low.

The following describes the technical solutions in this application by using several example embodiments.

Figure 5:
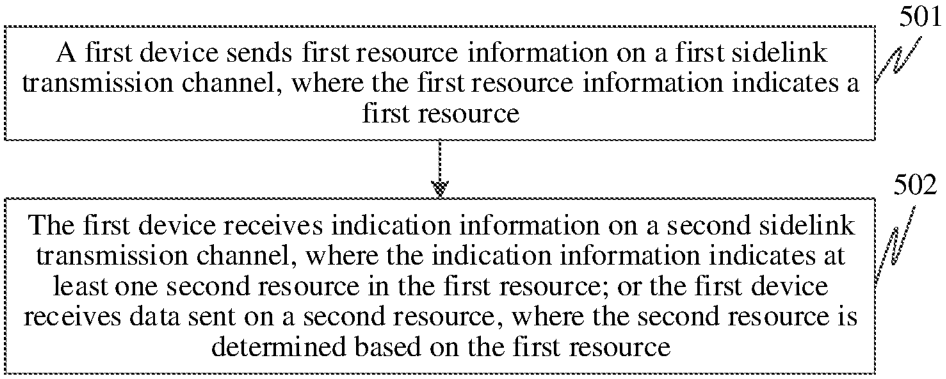
FIG. 5 is a flowchart of a resource processing method according to an example embodiment.

FIG. 5 is a flowchart of a resource processing method according to an example embodiment. The method may be applied to the network architecture shown in FIG. 4. The method may include the following several steps.

Step 501: A first device sends first resource information on a first sidelink transmission channel, where the first resource information indicates a first resource.

For example, the first device obtains the first resource, and sends, on the first sidelink transmission channel, the first resource information indicating the first resource.

Optionally, the first device obtains related information of the first resource from a second device, another UE, or a base station. The first resource information may indicate one or more first resources, and the first resource is also referred to as a first time-frequency resource.

Optionally, the first sidelink transmission channel is a PSSCH.

Step 502: The first device receives indication information on a second sidelink transmission channel, where the indication information indicates at least one second resource in the first resource; or the first device receives data sent on a second resource, where the second resource is determined based on the first resource.

In a possible implementation, the first device is a sending end device, and the second device is a receiving end device. After receiving the first resource information sent by the first device, the second device determines the at least one second resource in the first resource, and sends, to the first device on the second sidelink transmission channel, the indication information indicating the at least one second resource. Accordingly, the first device receives, on the second sidelink transmission channel, the indication information sent by the second device.

There are the following two possible cases in which the second device determines the at least one second resource in the first resource. In one case, when there is one first resource, the second resource is the first resource. In the other case, when there are a plurality of first resources, the at least one second resource is one or more of the first resources.

The indication information indicates the one or more second resources in the first resource, and the second resource is also referred to as a second time-frequency resource.

Optionally, the second sidelink transmission channel is a PSFCH.

Optionally, after the first device receives the indication information on the second sidelink transmission channel, the first device sends data on the second resource.

In another possible implementation, the first device is a receiving end device, and the second device is a sending end device. After receiving the first resource information sent by the first device, the second device determines the second resource based on the first resource, and sends the data on the second resource. Accordingly, the first device receives the data sent by the second device on the second resource.

There are the following two possible cases in which the second device determines the second resource based on the first resource. In one case, when there is one first resource, the second resource is the first resource. In the other case, when there are a plurality of first resources, the second resource is one of the first resources.

It should be noted that, in this embodiment of this application, the sending end device is a device that sends the data on the second resource, and the receiving end device is a device that receives the data on the second resource.

In conclusion, in this embodiment of this application, the first device sends, on the first sidelink transmission channel, the first resource information indicating the first resource, so that the second device determines the second resource based on the first resource. The second device may send, on the second sidelink transmission channel, the indication information indicating the at least one second resource, or may directly send the data on the determined second resource. Because the second resource is determined based on the first resource, a case in which a resource included in resource information is not necessarily an idle resource of the first device in a related technology is avoided, accuracy of the resource information that is fed back is ensured, and feedback efficiency of the resource information is effectively improved.

Figure 6:
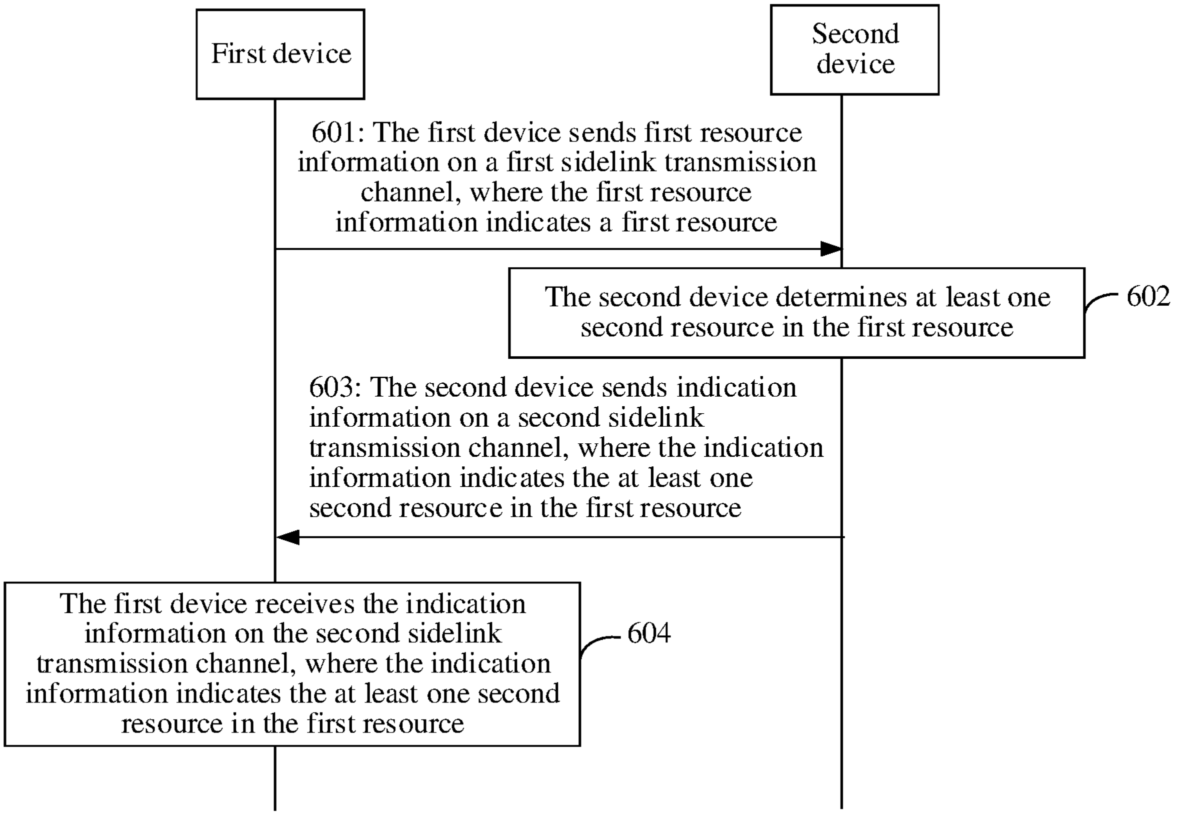
FIG. 6 is a flowchart of a resource processing method according to another example embodiment.

FIG. 6 is a flowchart of a resource processing method according to another example embodiment. The method may be applied to the network architecture shown in FIG. 4. A first device is a sending end device, and a second device is a receiving end device. The method may include the following several steps.

Step 601: The first device sends first resource information on a first sidelink transmission channel, where the first resource information indicates a first resource.

Optionally, the first device sends, on the first sidelink transmission channel, control information and information that carries data, namely, data information. The first resource information is carried in the control information, and the control information and the data information are separately encoded. Even if a decoding error of the data information occurs, because the data information and the control information are separately encoded, there is no case in which the first resource information in the control information cannot be decoded due to the decoding error of the data information.

The first resource information indicates one or more first resources.

Optionally, the first sidelink transmission channel is a PSSCH.

Step 602: The second device determines at least one second resource in the first resource.

After receiving the first resource information indicating the first resource, the second device determines the at least one second resource in the first resource based on a result locally sensed by the second device and/or information about a resource occupied by transmission of the second device, where the at least one second resource may be one or more second resources.

Optionally, if one resource in the first resource satisfies a preset condition, the second device removes the resource from a resource pool. That is, the at least one second resource does not include the resource. For example, the preset condition includes: An interference parameter locally sensed by the second device on the resource is greater than a preset threshold, or the second device transmits other data on the resource. For example, the second device has another receiving service or sending service on the resource.

In a possible implementation, when the second device fails to receive the data information, the second device determines the at least one second resource in the first resource indicated by the first resource information. When the second device successfully receives the data information, the second device does not perform the foregoing procedure of determining the second resource.

In a possible implementation, when a scenario of feeding back ACK information or NACK information is configured for the second device, the second device determines the at least one second resource in the first resource regardless of a decoding result.

Step 603: The second device sends indication information on a second sidelink transmission channel, where the indication information indicates the at least one second resource in the first resource.

The second device sends, on the second sidelink transmission channel, the indication information indicating the at least one second resource, where the indication information is used by the first device for reference during next time of transmission.

Optionally, the second sidelink transmission channel is a PSFCH.

Optionally, the indication information includes a code domain resource, and the code domain resource corresponds to the at least one second resource. An indication manner of the indication information is not limited in this embodiment of this application. The following descriptions are provided by using an example in which the indication information includes the code domain resource.

Optionally, the second device sends the indication information when sending the ACK information or the NACK information on the second sidelink transmission channel. The ACK information indicates that data receiving succeeds, and the NACK information indicates that the data receiving fails.

It should be noted that, when the ACK information or the NACK information and the indication information of the second resource are transmitted together, the ACK information or the NACK information and the indication information of the second resource need to be combined and then correspond to the code domain resource.

Optionally, the ACK information is defined to correspond to a first code domain resource group, where each code domain resource in the first code domain resource group corresponds to a second resource in an ACK scenario; and the NACK information is defined to correspond to a second code domain resource group, where each code domain resource in the second code domain resource group corresponds to a second resource in a NACK scenario. The first code domain resource group is different from the second code domain resource group. After the first device receives the code domain resource, when the received code domain resource is in the first code domain resource group, the first device detects that information that is fed back is the ACK information; or when the received code domain resource is in the second code domain resource group, the first device detects that information that is fed back is the NACK information.

In an example, as shown in FIG. 6, the indication information is carried on the PSFCH, and one PRB includes 12 code domain resources. If the NACK information is fed back, only one code domain resource is occupied, and there are still 11 optional code domain resources on the PRB. The code domain resource is in a one-to-one correspondence with the at least one second resource in a sequence of the first resources. In a scenario with a plurality of PRBs, there are more code domain resources, and the code domain resources can be in a one-to-one correspondence with more second resources. When the second device feeds back the indication information including the code domain resource, the first device determines the at least one second resource in the first resource based on the at least one second resource corresponding to the code domain resource.

For example, the second sidelink transmission channel is the PSFCH. A quantity of available code domain resources on the PSFCH is determined based on a quantity of subchannels, a periodicity of the PSFCH, and a CS interval. The code domain resource is in a one-to-one correspondence with the at least one second resource, and an upper limit value of the quantity of code domain resources is greater than or equal to a quantity of second resources.

Step 604: The first device receives the indication information on the second sidelink transmission channel, where the indication information indicates the at least one second resource in the first resource.

The first device receives, on the second sidelink transmission channel, the indication information sent by the second device, where the indication information indicates the at least one second resource in the first resource.

Optionally, after receiving the indication information on the second sidelink transmission channel, the first device determines, in the at least one second resource, a resource used for sending.

Optionally, the first device determines, in the at least one second resource, a resource used for initial transmission or retransmission. The first device sends data on the determined second resource.

Figure 7:
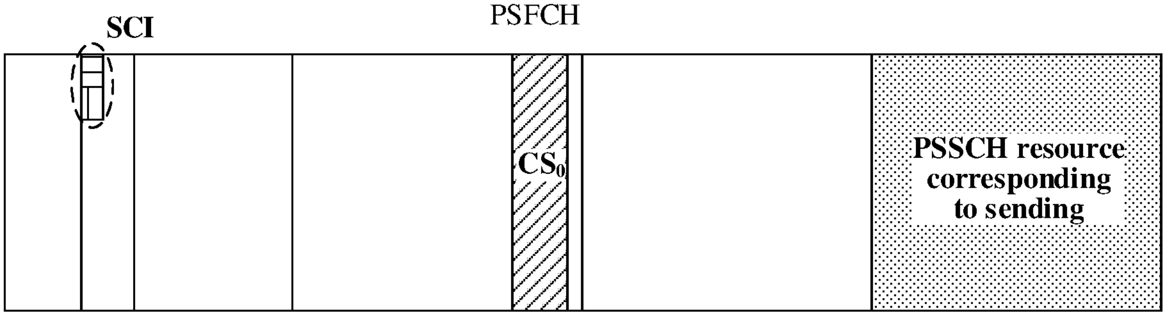
FIG. 7 is a schematic diagram of indication information in a resource processing method according to an example embodiment.

In an example, as shown in FIG. 7, after the second device receives SCI that is sent by the first device and that indicates the first resource, the second device sends the indication information on the PSFCH, where the indication information indicates the at least one second resource in the first resource. After receiving the indication information on the PSFCH, the first device determines, in the at least one second resource, a PSSCH resource corresponding to sending. A cyclic shift $cs_o$ identifies one of the 12 code domain resources on the PSFCH, and the code domain resources are differentiated by using different cyclic shifts.

In conclusion, in this embodiment of this application, the first device sends, on the first sidelink transmission channel, the first resource information indicating the first resource, the second device determines the at least one second resource in the first resource, and the second device sends, on the second sidelink transmission channel, the indication information indicating the at least one second resource, so that the resource that is subsequently determined by the first device in the at least one second resource and that is used for sending is a resource that is idle in both the first device and the second device, and a data transmission effect is ensured. In addition, in this embodiment of this application, when sending the data on the first sidelink transmission channel, the first device further sends the first resource information indicating the first resource. If the second device successfully receives the data, a recommended first resource does not need to be used. If the second device fails to receive the data, the second device may select the at least one second resource in the first resource based on a local interference status, and indicate the at least one second resource to the first device for use during next time of sending, so that separate communication does not need to be performed for exchange of resource information, and feedback efficiency of the resource information is effectively improved.

It should be noted that, in embodiments of this application, a first device sends, on a first sidelink transmission channel, first resource information indicating a first resource, where the first resource information includes time domain resource information and frequency domain resource information, the time domain resource information indicates a time domain resource corresponding to the first resource, and the frequency domain resource information indicates a frequency domain resource corresponding to the first resource.

Optionally, the time domain resource information includes a time domain resource range of the first resource. Alternatively, the time domain resource information includes information about a time domain window or a first bitmap.

Optionally, the frequency domain resource information includes a first identifier, and the first identifier indicates a frequency domain resource range corresponding to the first resource. Alternatively, the frequency domain resource information includes information about a frequency domain window or a second bitmap.

Therefore, a manner in which the first resource information indicates the first resource includes but is not limited to the following several possible implementations:

In a possible implementation, the first resource is indicated in dimensions of a time domain and a frequency domain.

In this implementation, the time domain resource information includes the time domain resource range of the first resource, the frequency domain resource information includes the first identifier, and the first identifier indicates the frequency domain resource range corresponding to the first resource.

Optionally, the first identifier occupies one bit. When the first identifier is a first value, the first identifier indicates a first frequency domain resource range. When the first identifier is a second value, the first identifier indicates a second frequency domain resource range. The first value is different from the second value, and the first frequency domain resource range is different from the second frequency domain resource range.

For example, the time domain resource range is T, and the frequency domain resource range is S−m+1, where S is a total quantity of subchannels, and m is a quantity of occupied subchannels. A quantity of bits occupied by the time domain resource is $[N\times\log_2 T]$ or $N\times[\log_2 T]$, and a quantity of bits occupied by the frequency domain resource is $[N\times\log_2 (S+1-m)]$ or $N\times[\log_2 (S+1-m)]$, where N is a quantity of first resources. For example, T=32 slots (slots). When S=10, and m=1, a quantity of bits occupied by the first resource is 5 bits (the time domain resource information)+4 bits (the frequency domain resource information).

The time domain resource information and the frequency domain resource information may be carried in SCI, and a resource placement order is in a one-to-one correspondence with a PSFCH cyclic shift.

In another possible implementation, the second bitmap indicates the frequency domain resource, and the information about the time domain window indicates the time domain resource.

In this implementation, the frequency domain resource information includes the second bitmap, where the second bitmap indicates frequency domain resources that are in first resources and that are continuously or discontinuously distributed. Optionally, a quantity of bits occupied by the frequency domain resources is S−m+1, where S is a total quantity of subchannels, and m is a quantity of occupied subchannels.

The time domain resource information includes the information about the time domain window, where the information about the time domain window includes at least two of a time domain start position, time domain duration, or a time domain end position of the first resource. The foregoing frequency domain resources in the time domain window are all first resources.

For example, the time domain start position or the time domain end position is T, and a quantity of occupied bits is $[\log_2 T_{max}]$, where $T_{max}$ is a maximum slot tag; and the time domain duration is L, and a quantity of occupied bits is $[\log_2 L_{max}]$, where $L_{max}$ is maximum duration, and $L_{max}$ may be predefined.

Optionally, each bit of the second bitmap corresponds to one subchannel. When at least one bit of the second bitmap in frequency domain in the time domain window is a first value, it indicates that a subchannel corresponding to the at least one bit is a frequency domain resource position of the first resource. For example, the first value is 1. This is not limited in this embodiment of this application.

Figure 8:
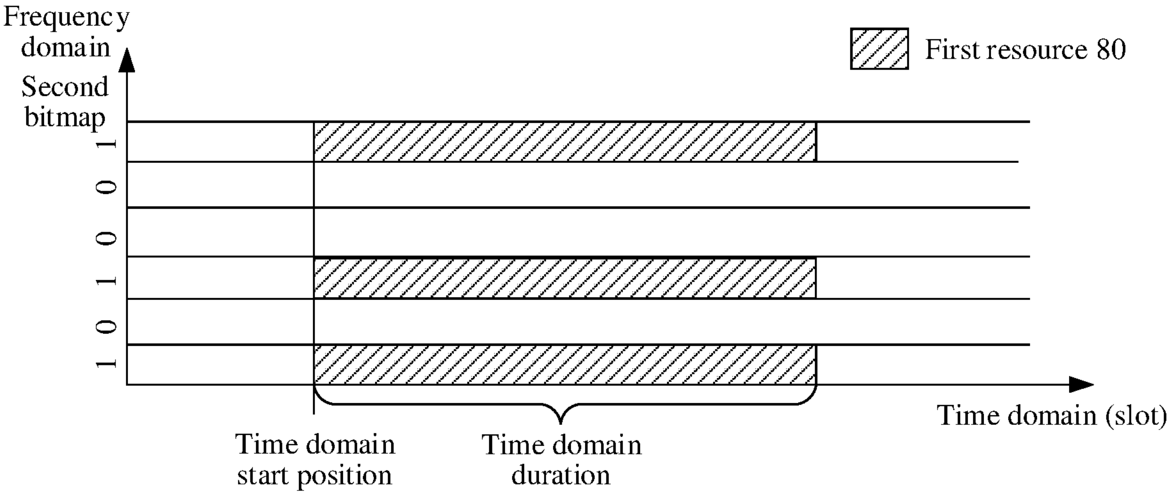
FIG. 8 is a schematic diagram of a manner in which first resource information indicates first resources according to an example embodiment.

In an example, as shown in FIG. 8, a resource corresponding to 1 set in the second bitmap in frequency domain in the time domain window is a first resource 80. "101001" in frequency domain indicates frequency domain resource positions of first resources on six continuous subchannels.

In another possible implementation, the information about the frequency domain window indicates the frequency domain resource, and the information about the time domain window indicates the time domain resource.

In this implementation, the frequency domain resource information includes the information about the frequency domain window, where the information about the frequency domain window includes at least two of a frequency domain start subchannel, a quantity of continuous subchannels, and a frequency domain end subchannel of the first resource.

For example, the frequency domain start subchannel or the frequency domain end subchannel is F, and a quantity of occupied bits is $\lceil \log_2 F_{max} \rceil$, where $F_{max}$ is a maximum subchannel tag; and the quantity of continuous subchannels is M, and a quantity of occupied bits is $\lceil \log_2 M_{max} \rceil$, where $M_{max}$ is a maximum quantity of continuous subchannels, and $M_{max}$ may be predefined.

The time domain resource information includes the information about the time domain window, where the information about the time domain window includes at least two of a time domain start position, time domain duration, or a time domain end position of the first resource.

It should be noted that, for descriptions of the information about the time domain window, refer to the related descriptions in the foregoing implementation. Details are not described herein again.

Figure 9:
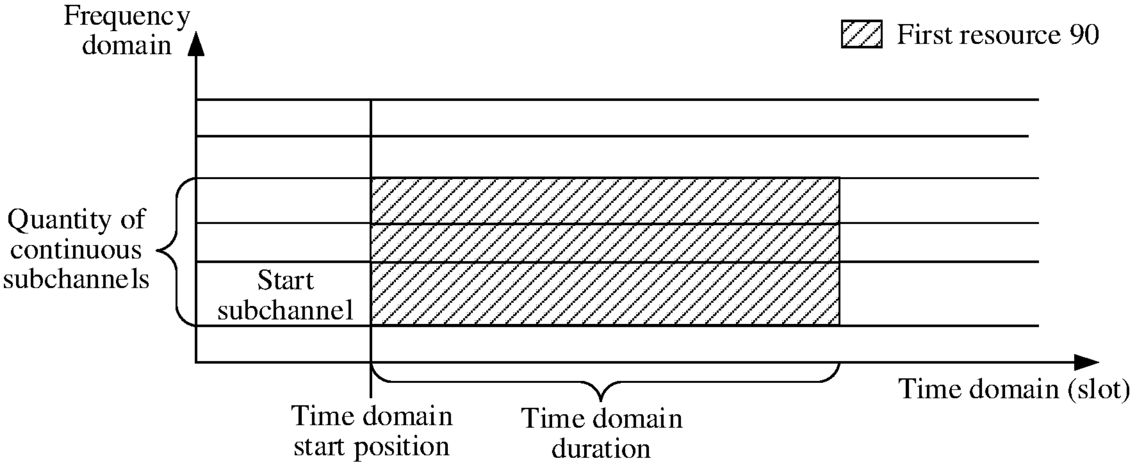
FIG. 9 is a schematic diagram of a manner in which first resource information indicates first resources according to another example embodiment.

In an example, as shown in FIG. 9, a resource in the time domain window and the frequency domain window is a first resource 90.

In another possible implementation, the information about the frequency domain window indicates the frequency domain resource, and the first bitmap indicates the time domain resource.

In this implementation, the frequency domain resource information includes the information about the frequency domain window, where the information about the frequency domain window includes at least two of a frequency domain start subchannel, a quantity of continuous subchannels, and a frequency domain end subchannel of the first resource.

It should be noted that, for descriptions of the information about the frequency domain window, refer to the related descriptions in the foregoing implementation. Details are not described herein again.

The time domain resource information includes the first bitmap, where the first bitmap indicates time domain resources that are in first resources and that are continuously or discontinuously distributed. Optionally, a quantity of bits occupied by the time domain resources is $T_{max}$.

Optionally, each bit of the first bitmap corresponds to one slot. When at least one bit of the first bitmap in time domain in the frequency domain window is a second value, it indicates that a slot corresponding to the at least one bit is a time domain resource position of the first resource. For example, the second value is 1. This is not limited in this embodiment of this application.

Figure 10:
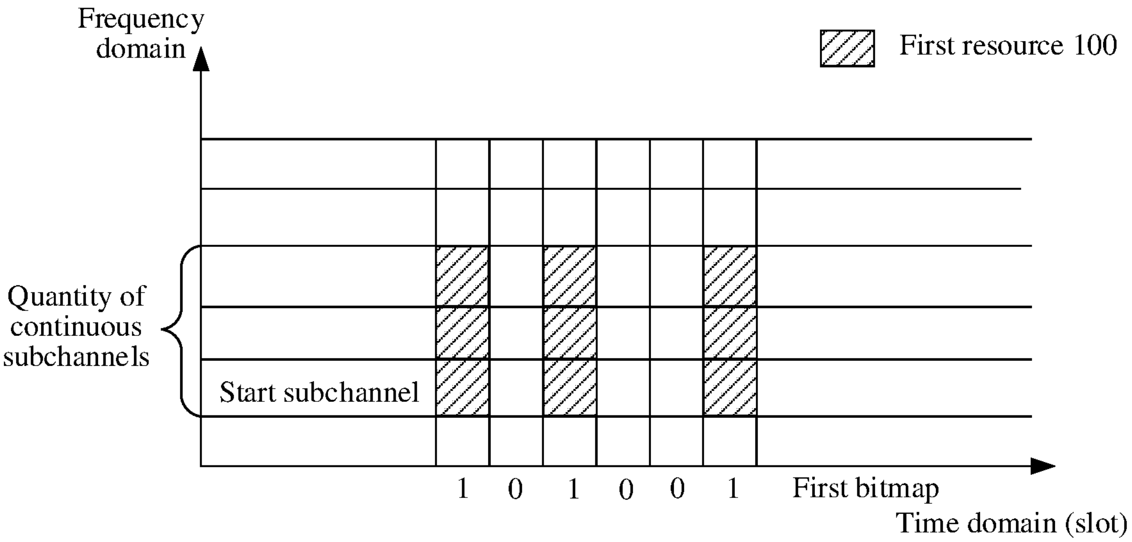
FIG. 10 is a schematic diagram of a manner in which first resource information indicates first resources according to another example embodiment.

In an example, as shown in FIG. 10, a resource corresponding to 1 set in the first bitmap in time domain in the frequency domain window is a first resource 100. "101001" in time domain indicates time domain resource positions of first resources in six continuous slots.

In another possible implementation, information about the second bitmap indicates the frequency domain resource, and the first bitmap indicates the time domain resource.

In this implementation, the frequency domain resource information includes the second bitmap, where the second bitmap indicates frequency domain resources that are in first resources and that are continuously or discontinuously distributed. Optionally, a quantity of bits occupied by the frequency domain resources is S−m+1.

The time domain resource information includes the first bitmap, where the first bitmap indicates time domain resources that are in first resources and that are continuously or discontinuously distributed. Optionally, a quantity of bits occupied by the time domain resources is $T_{max}$.

It should be noted that, for descriptions of the first bitmap and the second bitmap, refer to the related descriptions in the foregoing implementations. Details are not described herein again.

Figure 11:
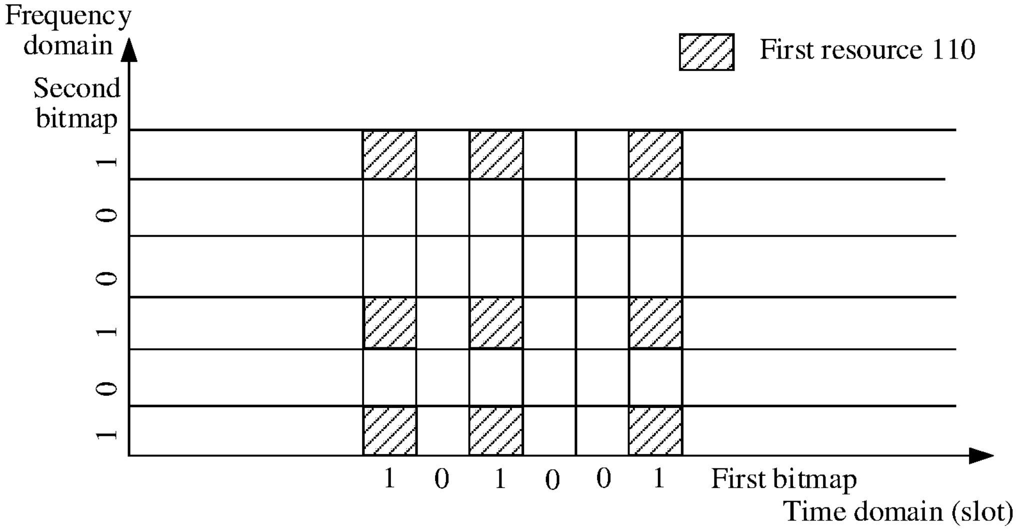
FIG. 11 is a schematic diagram of a manner in which first resource information indicates first resources according to another example embodiment.

In an example, as shown in FIG. 11, a resource corresponding to 1 set in both the first bitmap and the second bitmap is a first resource 110. "101001" in frequency domain indicates frequency domain resource positions of first resources on six continuous subchannels, and "101001" in time domain indicates time domain resource positions of first resources in six continuous slots.

It should be noted that, in embodiments of this application, the first resource information may indicate the first resource in any one of the foregoing possible implementations or in another possible indication manner. This is not limited in embodiments of this application. Based on any possible indication manner, the quantity of first resources, a quantity of time domain windows, a quantity of frequency domain windows, a quantity of first bitmaps, or a quantity of second bitmaps may be determined in the following manners.

Optionally, an upper limit value of the quantity of first resources and/or the quantity of first resources are/is predefined in a protocol, or are/is preconfigured by using configuration information.

For example, the configuration information is radio resource control (Radio Resource Control, RRC) signaling. For example, configuration information for configuring a transmission resource pool includes the upper limit value of the quantity of first resources and/or the quantity of first resources.

Optionally, the first quantity (including the quantity of first resources, or including at least one of the quantity of time domain windows that corresponds to the first resource, the quantity of frequency domain windows that corresponds to the first resource, the quantity that is of first bitmaps indicating time domain resources and that corresponds to the first resource, or the quantity that is of second bitmaps indicating frequency domain resources and that corresponds to the first resource) is indicated in SCI.

Optionally, the first resource information further indicates the first quantity. The first quantity includes the quantity of first resources, or the first quantity includes at least one of the quantity of time domain windows that corresponds to the first resource, the quantity of frequency domain windows that corresponds to the first resource, the quantity that is of first bitmaps indicating time domain resources and that corresponds to the first resource, or the quantity that is of second bitmaps indicating frequency domain resources and that corresponds to the first resource.

Optionally, the first resource information includes the time domain resource information and the frequency domain resource information of the first resource, and the first resource information further includes the first quantity or a first parameter associated with the first quantity.

Optionally, second-stage SCI includes the first quantity or the first parameter associated with the first quantity. However, if the second-stage SCI includes the first quantity or the first parameter associated with the first quantity, there is a risk that a second device does not know, when the second device does not decode the second-stage SCI, a quantity of resources carried in the second-stage SCI, and therefore does not know a size range. To avoid this case, indication may be performed in first-stage SCI. A value indicated by the first-stage SCI is configured by using RRC signaling. For example, four optional values such as 2, 4, 8, and 16 are configured. Two bits are provided in the first-stage SCI to indicate one of the four optional values. Alternatively, the first-stage SCI may indicate that the second-stage SCI carries the first quantity or the first parameter, the second-stage SCI carries the first quantity or the first parameter associated with the first quantity, and third-stage SCI carries the first resource information.

An indication manner of the first resource information includes but is not limited to the following several possible implementations:

In a possible implementation, the first-stage SCI indicates the first quantity, and the first-stage SCI includes the first quantity or the first parameter associated with the first quantity; and the second-stage SCI indicates the first resource, and the second-stage SCI includes the time domain resource information and the frequency domain resource information of the first resource.

Optionally, the first device determines, based on the first quantity or the first parameter in the first-stage SCI, a quantity of bits occupied by the second-stage SCI.

The first-stage SCI and the second-stage SCI are sent on the first sidelink transmission channel. The first-stage SCI is also referred to as SCI-1, and the second-stage SCI is also referred to as SCI-2.

Optionally, the first parameter associated with the first quantity includes a parameter that is proportional to the first quantity. For example, the first parameter includes a preset multiple of the first quantity.

In another possible implementation, the first-stage SCI may indicate that the second-stage SCI carries the first quantity or the first parameter associated with the first quantity; the second-stage SCI may indicate the first quantity, and the second-stage SCI includes the first quantity or the first parameter associated with the first quantity; and the third-stage SCI may indicate the first resource, and the third-stage SCI includes the time domain resource information and the frequency domain resource information of the first resource.

Optionally, the first device determines, based on the first quantity or the first parameter in the second-stage SCI, a quantity of bits occupied by the third-stage SCI.

The first-stage SCI, the second-stage SCI, and the third-stage SCI are all sent on the first sidelink transmission channel. The first-stage SCI is also referred to as SCI-1, the second-stage SCI is also referred to as SCI-2, and the third-stage SCI is also referred to as SCI-3.

In another possible implementation, the first-stage SCI indicates that the second-stage SCI carries the first quantity or the first parameter associated with the first quantity; the second-stage SCI indicates a quantity of bits occupied by the third-stage SCI; and the third-stage SCI includes the time domain resource information and the frequency domain resource information of the first resource.

In another possible implementation, the second-stage SCI indicates a quantity of bits occupied by the third-stage SCI; and the third-stage SCI includes the time domain resource information and the frequency domain resource information of the first resource.

It should be noted that the foregoing stages of SCI may be simultaneously sent. For example, when the second-stage SCI and the third-stage SCI are sent, a part corresponding to the second-stage SCI is indicated to be decoded first. Alternatively, the foregoing stages of SCI may be separately sent. This is not limited in embodiments of this application.

A manner of carrying the time domain resource information and the frequency domain resource information of the first resource includes but is not limited to the following several possible implementations:

In a possible implementation, the SCI indicating the first quantity includes the time domain resource information and the frequency domain resource information of the first resource.

In another possible implementation, the first-stage SCI or the second-stage SCI includes the time domain resource information and the frequency domain resource information of the first resource.

In another possible implementation, the first-stage SCI indicates a format of the second-stage SCI. For example, the format of the second-stage SCI is an SCI format 2-C or an SCI format 2-D. The second-stage SCI includes the first quantity or the first parameter associated with the first quantity. The third-stage SCI includes the time domain resource information and the frequency domain resource information of the first resource.

In conclusion, in embodiments of this application, the time domain resource information of the first resource information includes the time domain resource range of the first resource; or the time domain resource information includes the information about the time domain window or the first bitmap. The frequency domain resource information includes the first identifier, where the first identifier indicates the frequency domain resource range corresponding to the first resource; or the frequency domain resource information includes the information about the frequency domain window or the second bitmap. Embodiments of this application provide a plurality of possible indication manners in which the first resource information indicates the first resource, thereby improving diversity and flexibility of a manner in which the first sidelink transmission channel carries the first resource.

In embodiments of this application, the first resource information further indicates the first quantity. The first quantity includes the quantity of first resources, or the first quantity includes at least one of the quantity of time domain windows that corresponds to the first resource, the quantity of frequency domain windows that corresponds to the first resource, the quantity that is of first bitmaps indicating time domain resources and that corresponds to the first resource, or the quantity that is of second bitmaps indicating frequency domain resources and that corresponds to the first resource. The foregoing quantity may be indicated by the SCI, so that quantity information related to the first resource may be obtained before the first resource information is decoded.

Figure 12:
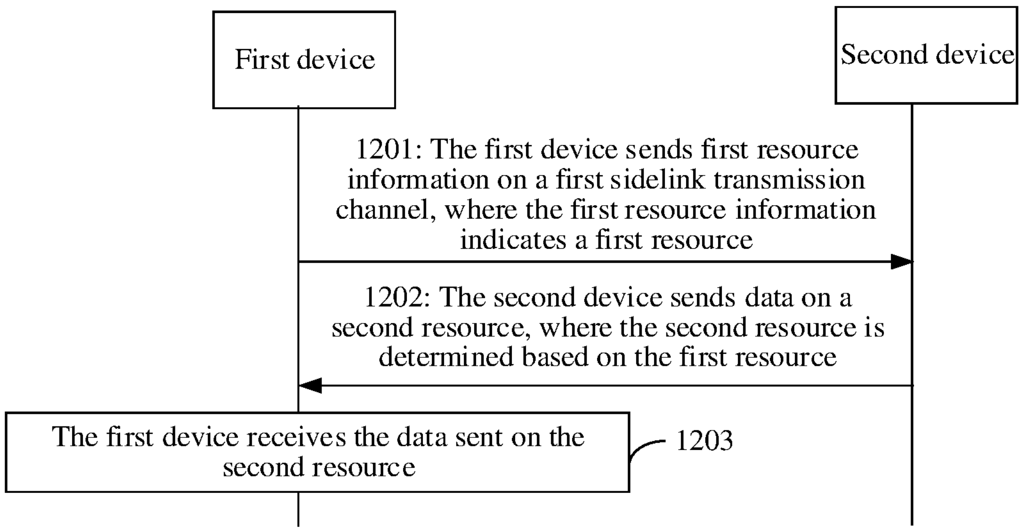
FIG. 12 is a flowchart of a resource processing method according to another example embodiment.

FIG. 12 is a flowchart of a resource processing method according to another example embodiment. The method may be applied to the network architecture shown in FIG. 4. A first device is a receiving end device, and a second device is a sending end device. The method may include the following several steps.

Step 1201: The first device sends first resource information on a first sidelink transmission channel, where the first resource information indicates a first resource.

The first resource information indicates one or more first resources.

Optionally, the first resource information includes time domain resource information and frequency domain resource information, the time domain resource information indicates a time domain resource corresponding to the first resource, and the frequency domain resource information indicates a frequency domain resource corresponding to the first resource.

Optionally, the time domain resource information includes a time domain resource range of the first resource. Alternatively, the time domain resource information includes information about a time domain window or a first bitmap.

Optionally, the frequency domain resource information includes a first identifier, and the first identifier indicates a frequency domain resource range corresponding to the first resource. Alternatively, the frequency domain resource information includes information about a frequency domain window or a second bitmap.

A manner in which the first resource information indicates the first resource includes but is not limited to the several possible implementations provided in the foregoing embodiments.

In a possible implementation, the first resource is indicated in dimensions of a time domain and a frequency domain.

In another possible implementation, the second bitmap indicates the frequency domain resource, and the information about the time domain window indicates the time domain resource.

In another possible implementation, the information about the frequency domain window indicates the frequency domain resource, and the information about the time domain window indicates the time domain resource.

In another possible implementation, the information about the frequency domain window indicates the frequency domain resource, and the first bitmap indicates the time domain resource.

In another possible implementation, information about the second bitmap indicates the frequency domain resource, and the first bitmap indicates the time domain resource.

It should be noted that, for related details, refer to the related descriptions in the foregoing embodiments. Details are not described herein again.

Step 1202: The second device sends data on a second resource, where the second resource is determined based on the first resource.

After receiving the first resource information sent by the first device, the second device determines the second resource based on the first resource, and sends the data on the second resource.

There are the following two possible cases in which the second device determines the second resource based on the first resource. In one case, when there is one first resource, the second resource is the first resource. In the other case, when there are a plurality of first resources, the second resource is one of the first resources.

Step 1203: The first device receives the data sent on the second resource.

Accordingly, the first device receives the data sent by the second device on the second resource.

Figure 13:
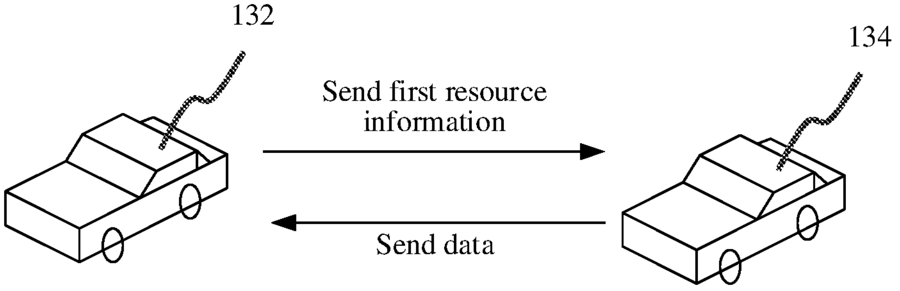
FIG. 13 is a schematic diagram of a scenario in a resource processing method according to another example embodiment.

In an example, devices that communicate with each other are both vehicles. As shown in FIG. 13, a first device 132 (for example, a UE-A) is a receiving end device, and a second device 134 (for example, a UE-B) is a sending end device. The first device 132 sends the first resource information to the second device 134 on the first sidelink transmission channel, where the first resource information indicates the first resource. The second device 134 determines the second resource based on the first resource, and sends the data to the first device 132 on the second resource.

In conclusion, the first device sends, on the first sidelink transmission channel, the first resource information indicating the first resource, so that the second device determines the second resource based on the first resource, and sends the data to the first device on the determined second resource. This ensures that the determined second resource is an idle resource of the first device, avoids a conflict between the second resource carrying the data and a transmission resource that is being used by the first device, and ensures a data transmission effect.

Figure 14:
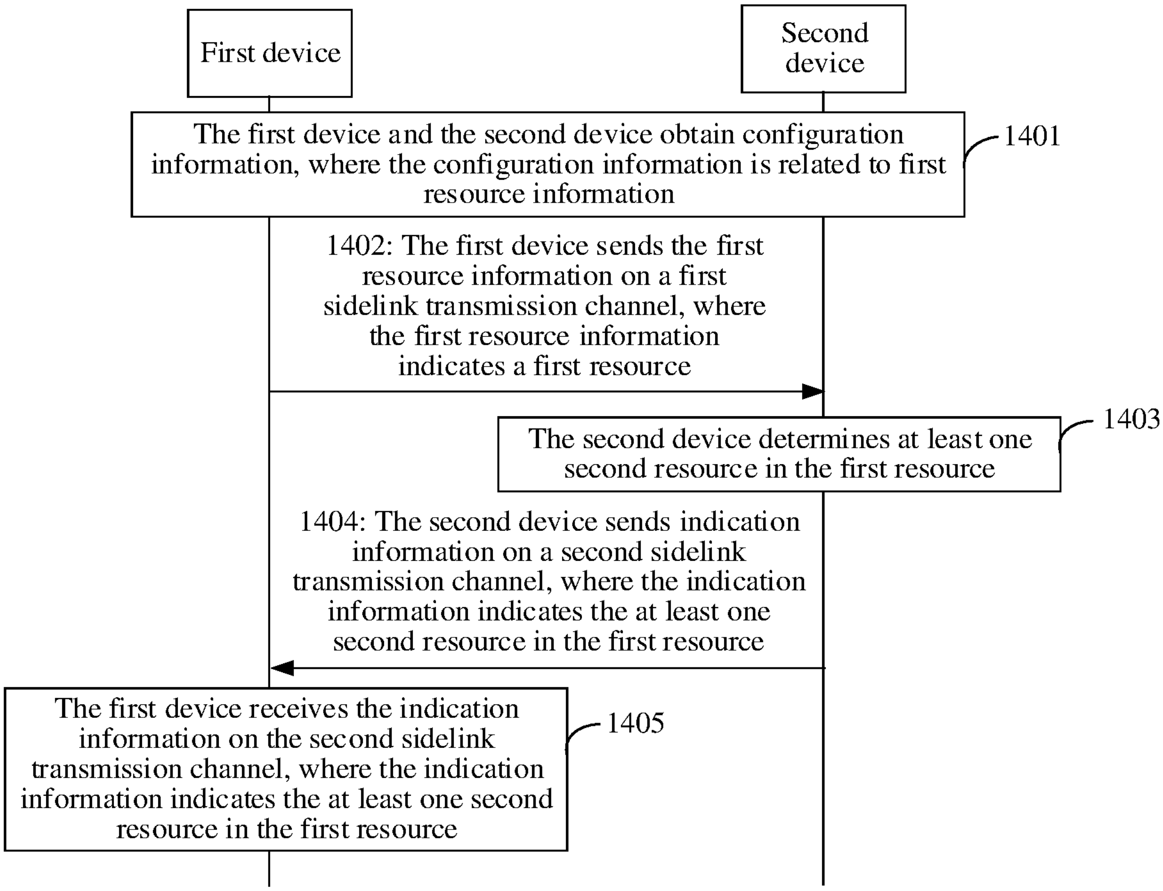
FIG. 14 is a flowchart of a resource processing method according to another example embodiment.

It should be noted that the resource processing method provided in embodiments of this application may be applied to a unicast communication scenario, or may be applied to a multicast communication scenario. In a possible implementation, the resource processing method provided in embodiments of this application is described by using an example in which a first device is a sending end device, a second device is a receiving end device, and a first sidelink transmission channel carries a first resource in the unicast communication scenario. To be specific, the first device may obtain related information of the first resource from the second device, another UE, a base station, or the like, and specific information of the first resource is obtained by combining information about the first sidelink transmission channel and the foregoing related information when the first sidelink transmission channel carries first resource information. In addition, when the second device feeds back indication information, the second device is not necessarily limited to feeding back the indication information when feeding back NACK information, and may also feed back the indication information when feeding back ACK information. FIG. 14 is a flowchart of a resource processing method according to another example embodiment. The method may be applied to the network architecture shown in FIG. 4. The method may include the following several steps.

Step 1401: A first device and a second device obtain configuration information, where the configuration information is related to first resource information.

Optionally, the configuration information may be configured by the second device, or may be configured by another UE or a base station. This is not limited in this embodiment of this application.

Optionally, the configuration information indicates a window size range of a time domain window and/or a window size range of a frequency domain window of a first resource. For example, the configuration information includes a second identifier and/or a third identifier, the second identifier indicates the window size range of the time domain window, and the third identifier indicates the window size range of the frequency domain window. The window size range of the time domain window includes an optional value or a granularity of a window length of the time domain window of the first resource, and the window size range of the frequency domain window includes an optional value or a granularity of a window length of the frequency domain window of the first resource.

For example, the window length of the time domain window includes four optional values: 1, 3, 4, and 6. “1” indicates that the window length of the time domain window is one slot, “s” indicates that the window length of the time domain window is three slots, “4” indicates that the window length of the time domain window is four slots, and “6” indicates that the window length of the time domain window is six slots. The second identifier occupying two bits indicates one of the four optional values as the window length of the time domain window.

Optionally, the configuration information further includes a fourth identifier, and the fourth identifier indicates whether the first device feeds back the first resource.

Step 1402: The first device sends the first resource information on a first sidelink transmission channel, where the first resource information indicates the first resource.

Step 1403: The second device determines at least one second resource in the first resource.

After receiving, on the first sidelink transmission channel, the first resource information indicating the first resource, the second device determines the indicated first resource based on the configuration information and the first resource information, and determines the at least one second resource in the first resource.

Optionally, the first sidelink transmission channel is a PSSCH.

It should be noted that, for a process in which the first device sends the first resource information on the first sidelink transmission channel and the second device determines the at least one second resource in the first resource, refer to the related descriptions in the foregoing embodiments. Details are not described herein again.

Step 1404: The second device sends indication information on a second sidelink transmission channel, where the indication information indicates the at least one second resource in the first resource.

Optionally, the second device sends the indication information when sending ACK information or NACK information on the second sidelink transmission channel.

In a possible implementation, the second device sends first signaling on the second sidelink transmission channel, where the first signaling includes the indication information and second information, and the second information includes the ACK information or the NACK information.

In this implementation, the second information and the indication information of the second resource are jointly encoded. For example, an offset value is added to a code domain resource corresponding to the second information. The offset value is determined based on a tag of the second resource determined in step 1403, or is determined based on a tag of the determined second resource and information related to the determined second resource.

In another possible implementation, the second device sends second signaling and third signaling on the second sidelink transmission channel, where the second signaling includes the indication information, and the third signaling includes the ACK information or the NACK information.

In this implementation, the ACK information or the NACK information and the indication information of the second resource are separately indicated. To be specific, the second device needs to occupy at least two code domain resources on the second sidelink transmission channel. One code domain resource corresponds to the ACK information or the NACK information, and the other code domain resource corresponds to the indication information of the second resource.

Optionally, the second sidelink transmission channel is a PSFCH.

Optionally, the indication information includes a code domain resource, and the code domain resource corresponds to the at least one second resource.

Step 1405: The first device receives the indication information on the second sidelink transmission channel, where the indication information indicates the at least one second resource in the first resource.

Optionally, that the first device receives the indication information on the second sidelink transmission channel includes but is not limited to the following two possible implementations.

In a possible implementation, the first device receives the first signaling on the second sidelink transmission channel, where the first signaling includes the indication information and the second information, and the second information includes the ACK information or the NACK information.

In the other possible implementation, the second signaling and the third signaling are received on the second sidelink transmission channel, where the second signaling includes the indication information, and the third signaling includes the ACK information or the NACK information.

Optionally, after receiving the indication information on the second sidelink transmission channel, the first device determines, based on the at least one second resource, a resource for sending data.

It should be noted that, for a process in which the first device determines, based on the at least one second resource, the resource for sending the data, refer to the related descriptions in the foregoing embodiments. Details are not described herein again.

In conclusion, in this embodiment of this application, the second device further sends the indication information of the second resource when sending the ACK information or the NACK information on the second sidelink transmission channel, so that a feedback manner of the ACK information or the NACK information and the indication information of the second resource is refined. In one feedback manner, the ACK information or the NACK information and the indication information of the second resource are separately indicated. That is, the second device needs to occupy the at least two code domain resources on the second sidelink transmission channel. In the other feedback manner, the ACK information or the NACK information and the indication information of the second resource are jointly encoded, one code domain resource on the second sidelink transmission channel is occupied, and both the ACK information or the NACK information and the indication information of the determined second resource may be indicated. This reduces unnecessary resource overheads.

Figure 15:
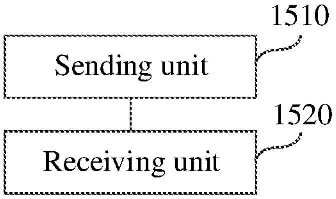
FIG. 15 is a block diagram of a resource processing apparatus according to an example embodiment of this application.

FIG. 15 is a block diagram of a resource processing apparatus according to an example embodiment of this application. The resource processing apparatus may be implemented as all or a part of a first device or a second device by using software, hardware, or a combination thereof. The resource processing apparatus may include a sending unit 1510 and a receiving unit 1520.

When the resource processing apparatus is implemented as all or the part of the first device by using the software, the hardware, or the combination thereof, functions implemented by the sending unit 1510 and the receiving unit 1520 include but are not limited to the following.

The sending unit 1510 is configured to send first resource information on a first sidelink transmission channel, where the first resource information indicates a first resource.

The receiving unit 1520 is configured to: receive indication information on a second sidelink transmission channel, where the indication information indicates at least one second resource in the first resource; or receive data sent on a second resource, where the second resource is determined based on the first resource.

In a possible implementation, the indication information includes a code domain resource, and the code domain resource corresponds to the at least one second resource.

In another possible implementation, the apparatus further includes a processing unit.

The processing unit is configured to determine, in the at least one second resource, a resource used for sending.

In another possible implementation, an upper limit value of a quantity of first resources and/or the quantity of first resources are/is predefined in a protocol, or are/is preconfigured by using configuration information.

In another possible implementation, the first resource information further indicates a first quantity, where the first quantity includes the quantity of first resources, or the first quantity includes at least one of a quantity of time domain windows that corresponds to the first resource, a quantity of frequency domain windows that corresponds to the first resource, a quantity that is of first bitmaps indicating time domain resources and that corresponds to the first resource, or a quantity that is of second bitmaps indicating frequency domain resources and that corresponds to the first resource.

In another possible implementation, the first quantity in the first resource information or a first parameter associated with the first quantity is in first-stage SCI, time domain resource information and frequency domain resource information of the first resource in the first resource information are in second-stage SCI, and the apparatus further includes the processing unit.

The processing unit is configured to determine, based on the first quantity or the first parameter, a quantity of bits occupied by the second-stage SCI.

In another possible implementation, the first quantity in the first resource information or a first parameter associated with the first quantity is in second-stage SCI, time domain resource information and frequency domain resource information of the first resource in the first resource information are in third-stage SCI, and the apparatus further includes the processing unit.

The processing unit is configured to determine, based on the first quantity or the first parameter, a quantity of bits occupied by the third-stage SCI.

In another possible implementation, time domain resource information and frequency domain resource information of the first resource in the first resource information are in third-stage SCI, and second-stage SCI indicates a quantity of bits occupied by the third-stage SCI.

In another possible implementation, the first resource information includes the time domain resource information and the frequency domain resource information, the time domain resource information indicates a time domain resource corresponding to the first resource, and the frequency domain resource information indicates a frequency domain resource corresponding to the first resource.

In another possible implementation, the time domain resource information includes a time domain resource range of the first resource, the frequency domain resource information includes a first identifier, and the first identifier indicates a frequency domain resource range corresponding to the first resource.

In another possible implementation, the time domain resource information includes information about the time domain window or the first bitmap, where the information about the time domain window includes at least two of a time domain start position, time domain duration, or a time domain end position of the first resource, and the first bitmap indicates the time domain resources that are in the first resources and that are continuously or discontinuously distributed.

In another possible implementation, the frequency domain resource information includes information about the frequency domain window or the second bitmap, where the information about the frequency domain window includes at least two of a frequency domain start subchannel, a quantity of continuous subchannels, and a frequency domain end subchannel of the first resource, and the second bitmap indicates the frequency domain resources that are in the first resources and that are continuously or discontinuously distributed.

In another possible implementation, the apparatus further includes:

the receiving unit 1520, further configured to receive configuration information, where the configuration information indicates a window size range of the time domain window and/or a window size range of the frequency domain window.

In another possible implementation, the receiving unit 1520 is further configured to:

receive first signaling on the second sidelink transmission channel, where the first signaling includes the indication information and second information, and the second information includes ACK information or NACK information; or receive second signaling and third signaling on the second sidelink transmission channel, where the second signaling includes the indication information, and the third signaling includes ACK information or NACK information.

In another possible implementation, the first sidelink transmission channel is a PSSCH, and the second sidelink transmission channel is a PSFCH.

It should be noted that, when the apparatus implements functions thereof, division into the foregoing units is merely used as an example for description. During actual application, the foregoing functions may be allocated to different units for implementation based on an actual requirement. That is, an internal structure of the first device is divided into different units, to implement all or some of the foregoing functions.

For the apparatus in the foregoing embodiment, a specific manner of performing an operation by each unit has been described in detail in the embodiment of the method. For related details, refer to the foregoing method embodiment. Details are not described herein.

When the resource processing apparatus is implemented as all or the part of the second device by using the software, the hardware, or the combination thereof, functions implemented by the sending unit 1510 and the receiving unit 1520 include but are not limited to the following.

The receiving unit 1520 is configured to receive first resource information on a first sidelink transmission channel, where the first resource information indicates a first resource.

The sending unit 1510 is configured to: send indication information on a second sidelink transmission channel, where the indication information indicates at least one second resource in the first resource; or send data on a second resource, where the second resource is determined based on the first resource.

In a possible implementation, the indication information includes a code domain resource, and the code domain resource corresponds to the at least one second resource.

In another possible implementation, an upper limit value of a quantity of first resources and/or the quantity of first resources are/is predefined in a protocol, or are/is preconfigured by using configuration information.

In another possible implementation, the first resource information further indicates a first quantity, where the first quantity includes the quantity of first resources, or the first quantity includes at least one of a quantity of time domain windows that corresponds to the first resource, a quantity of frequency domain windows that corresponds to the first resource, a quantity that is of first bitmaps indicating time domain resources and that corresponds to the first resource, or a quantity that is of second bitmaps indicating frequency domain resources and that corresponds to the first resource.

In another possible implementation, the first quantity in the first resource information or a first parameter associated with the first quantity is in first-stage SCI, time domain resource information and frequency domain resource information of the first resource in the first resource information are in second-stage SCI, and the apparatus further includes a processing unit.

The processing unit is configured to determine, based on the first quantity or the first parameter, a quantity of bits occupied by the second-stage SCI.

In another possible implementation, the first quantity in the first resource information or a first parameter associated with the first quantity is in second-stage SCI, time domain resource information and frequency domain resource information of the first resource in the first resource information are in third-stage SCI, and the apparatus further includes a processing unit.

The processing unit is configured to determine, based on the first quantity or the first parameter, a quantity of bits occupied by the third-stage SCI.

In another possible implementation, time domain resource information and frequency domain resource information of the first resource in the first resource information are in third-stage SCI, and second-stage SCI indicates a quantity of bits occupied by the third-stage SCI.

In another possible implementation, the first resource information includes time domain resource information and frequency domain resource information, the time domain resource information indicates a time domain resource corresponding to the first resource, and the frequency domain resource information indicates a frequency domain resource corresponding to the first resource.

In another possible implementation, the time domain resource information includes a time domain resource range of the first resource, the frequency domain resource information includes a first identifier, and the first identifier indicates a frequency domain resource range corresponding to the first resource.

In another possible implementation, the time domain resource information includes information about a time domain window or a first bitmap, where the information about the time domain window includes at least two of a time domain start position, time domain duration, or a time domain end position of the first resource, and the first bitmap indicates time domain resources that are in first resources and that are continuously or discontinuously distributed.

In another possible implementation, the frequency domain resource information includes information about a frequency domain window or a second bitmap, where the information about the frequency domain window includes at least two of a frequency domain start subchannel, a quantity of continuous subchannels, or a frequency domain end subchannel of the first resource, and the second bitmap indicates frequency domain resources that are in first resources and that are continuously or discontinuously distributed.

In another possible implementation, the apparatus further includes:

the receiving unit 1520, further configured to receive configuration information, where the configuration information indicates a window size range of the time domain window and/or a window size range of the frequency domain window.

In another possible implementation, the sending unit 1510 is further configured to:

send first signaling on the second sidelink transmission channel, where the first signaling includes the indication information and second information, and the second information includes ACK information or NACK information; or send second signaling and third signaling on the second sidelink transmission channel, where the second signaling includes the indication information, and the third signaling includes ACK information or NACK information.

In another possible implementation, the first sidelink transmission channel is a PSSCH, and the second sidelink transmission channel is a PSFCH.

It should be noted that, when the apparatus implements functions thereof, division into the foregoing units is merely used as an example for description. During actual application, the foregoing functions may be allocated to different units for implementation based on an actual requirement. That is, an internal structure of the second device is divided into different units, to implement all or some of the foregoing functions.

For the apparatus in the foregoing embodiment, a specific manner of performing an operation by each unit has been described in detail in the embodiment of the method. For related details, refer to the foregoing method embodiment. Details are not described herein.

Figure 16:
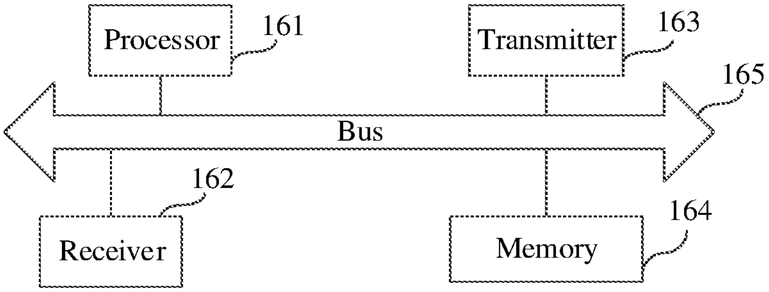
FIG. 16 is a schematic diagram of a structure of a first device according to an example embodiment of this application.

FIG. 16 is a schematic diagram of a structure of a first device according to an example embodiment of this application. The first device includes a processor 161, a receiver 162, a transmitter 163, a memory 164, and a bus 165.

The processor 161 includes one or more processing cores, and the processor 161 runs a software program and a module, to perform various function applications and process information.

The receiver 162 and the transmitter 163 may be implemented as a communication component. The communication component may be a communication chip. The communication chip may include a receiving module, a transmitting module, a modulation and demodulation module, and the like, and is configured to modulate and/or demodulate information, and receive or send the information by using a radio signal.

The memory 164 is connected to the processor 161 through the bus 165. The memory 164 stores program instructions and data that are necessary for the first device.

The processor 161 is configured to execute the program instructions and the data in the memory 164, to implement the functions of the steps performed by the first device in the method embodiments of this application.

The processor 161 runs at least one program instruction in the memory 164 to control the receiver 162 to implement a receiving function on a first device side in the foregoing steps. The processor 161 runs at least one program instruction in the memory 164 to control the transmitter 163 to implement a sending function on the first device side in the foregoing steps.

In addition, the memory 164 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

It may be understood that FIG. 16 shows only a simplified design of the first device. In another embodiment, the first device may include any quantity of transmitters, receivers, processors, controllers, memories, communication units, and the like, and all first devices that can implement this application fall within the protection scope of this application.

A structure of a second device may be the same as or similar to the structure of the first device. Details are not described in this application herein again.

An embodiment of this application provides a resource processing apparatus. The apparatus includes a processor and a memory configured to store processor-executable instructions. The processor is configured to implement the foregoing methods when executing the instructions.

An embodiment of this application provides a computer program product, including computer-readable code or a non-volatile computer-readable storage medium carrying the computer-readable code. When the computer-readable code is run in a processor in an electronic device, the processor in the electronic device performs the foregoing methods.

An embodiment of this application provides a resource processing system. The system includes a first device and a second device. The first device is configured to perform the resource processing method performed by the first device in the foregoing embodiments, and the second device is configured to perform the resource processing method performed by the second device in the foregoing embodiments.

An embodiment of this application provides a non-volatile computer-readable storage medium, storing computer program instructions. When the computer program instructions are executed by a processor, the foregoing methods are implemented.

The computer-readable storage medium may be a tangible device that can retain and store instructions used by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a random access memory (Random Access Memory, RAM), a read-only memory (Read Only Memory, ROM), an erasable programmable read-only memory (an Electrically Programmable Read-Only Memory, EPROM or a flash memory), a static random access memory (Static Random Access Memory, SRAM), a portable compact disc read-only memory (Compact Disc Read-Only Memory, CD-ROM), a digital versatile disc (Digital Video Disc, DVD), a memory stick, a floppy disk, a mechanically encoded device such as a punch-card or a raised structure in a groove that stores instructions, and any suitable combination of the foregoing.

The computer-readable program instructions or the code herein may be downloaded from the computer-readable storage medium to computing/processing devices or to an external computer or an external storage device through a network such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer-readable program instructions from the network and forwards the computer-readable program instructions for storage in a computer-readable storage medium in the computing/processing device.

The computer program instructions for performing operations in this application may be assembly instructions, instruction set architecture (Instruction Set Architecture, ISA) instructions, machine instructions, machine-related instructions, microcode, firmware instructions, status setting data, or source code or target code written in one programming language or any combination of a plurality of programming languages. The programming languages include an object-oriented programming language such as Smalltalk and C++, and a conventional procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. When the remote computer is involved, the remote computer may be connected to the user computer through any type of network, including a local area network (Local Area Network, LAN) or a wide area network (Wide Area Network, WAN), or may be connected to an external computer (for example, connected by using an Internet service provider through the Internet). In some embodiments, an electronic circuit, for example, a programmable logic circuit, a field-programmable gate array (Field-Programmable Gate Array, FPGA), or a programmable logic array (Programmable Logic Array, PLA), is customized by using status information of the computer-readable program instructions. The electronic circuit may execute the computer-readable program instructions, to implement various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions generate, when executed by the processor of the computer or the another programmable data processing apparatus, an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/actions specified in the one or more blocks in the flowcharts and/or the block diagrams.

The computer-readable program instructions may alternatively be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implement the functions/actions specified in the one or more blocks in the flowcharts and/or block diagrams.

The flowcharts and the block diagrams in the accompanying drawings illustrate system architectures, functions, and operations of possible implementations of apparatuses, systems, methods, and computer program products according to a plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, the functions marked in the blocks may also occur in a sequence different from that marked in the accompanying drawings. For example, actually, two consecutive blocks may be executed substantially in parallel, and may sometimes be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (Application Specific Integrated Circuit, application specific integrated circuit)) that performs a corresponding function or action, or may be implemented by a combination of hardware and software, for example, firmware.

Although this application is described with reference to embodiments herein, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that the measures cannot be combined to produce a good effect.

Embodiments of this application are described above. The foregoing descriptions are examples, are not exhaustive, and are not limited to the disclosed embodiments. Many modifications and changes are apparent to a person of ordinary skill in the art without departing from the scope and spirit of embodiments. Selection of terms used in this specification is intended to best explain principles of embodiments, actual application, or improvements to technologies in the market, or to enable another person of ordinary skill in the art to understand embodiments disclosed in this specification.

What is claimed is:

1. An apparatus, comprising:

at least one processor; and a memory coupled to the at least one processor and configured to store programming instructions that, when executed by the at least one processor, cause the apparatus to:

send first resource information on a first sidelink transmission channel, wherein the first resource information indicates at least one first resource, wherein the first resource information is carried in a plurality of sidelink control information (SCI) stages on the first sidelink transmission channel, the plurality of SCI stages including a first stage and a second stage, wherein a quantity of bits occupied by the second stage is determined based on a first quantity indicated by the first stage, and wherein the second stage includes time domain resource information and frequency domain resource information of the at least one first resource; and receive indication information indicating at least one second resource in the at least one first resource on a second sidelink transmission channel or receive data sent on a third resource determined based on the at least one first resource.

2. The apparatus according to claim 1, wherein the indication information comprises a code domain resource, and the code domain resource corresponds to the at least one second resource.

3. The apparatus according to claim 1, wherein the programming instructions that, when executed by the at least one processor, further cause the apparatus to:

after receiving the indication information on the second sidelink transmission channel, determine a resource for sending in the at least one second resource.

4. The apparatus according to claim 1, wherein an upper limit value of a quantity of the at least one first resource or the quantity of the at least one first resource is predefined in a protocol or is preconfigured by configuration information.

5. The apparatus according to claim 1, wherein:

the first quantity comprises a quantity of the at least one first resource; or the first quantity comprises a quantity of time domain windows that corresponds to the at least one first resource, a quantity of frequency domain windows that corresponds to the at least one first resource, a quantity that is of first bitmaps indicating time domain resources and that corresponds to the at least one first resource, or a quantity that is of second bitmaps indicating frequency domain resources and that corresponds to the at least one first resource.

6. The apparatus according to claim 5, wherein the first stage is first-stage SCI, and the second stage is second-stage SCI.

7. The apparatus according to claim 5, wherein the second stage is third-stage SCI, and the first stage is second-stage SCI.

8. The apparatus according to claim 7, wherein the first resource information comprises the time domain resource information and the frequency domain resource information, wherein the time domain resource information indicates a time domain resource corresponding to the at least one first resource, and wherein the frequency domain resource information indicates a frequency domain resource corresponding to the at least one first resource.

9. The apparatus according to claim 7, wherein the time domain resource information comprises information about a time domain window corresponding to the at least one first resource or a first bitmap corresponding to the at least one first resource, and wherein the information about the time domain window comprises at least two of a time domain start position of the at least one first resource, a time domain duration of the at least one first resource, or a time domain end position of the at least one first resource, and the first bitmap indicates the time domain resources that are in the at least one first resource and that are continuously or discontinuously distributed; or wherein the frequency domain resource information comprises information about a frequency domain window corresponding to the at least one first resource or a second bitmap corresponding to the at least one first resource, and wherein the information about the frequency domain window comprises at least two of a frequency domain start subchannel of the at least one first resource, a quantity of continuous subchannels of the at least one first resource, or a frequency domain end subchannel of the at least one first resource, and the second bitmap indicates the frequency domain resources that are in the at least one first resource and that are continuously or discontinuously distributed.

10. The apparatus according to claim 9, wherein the programming instructions that, when executed by the at least one processor, further cause the apparatus to:

receive configuration information, wherein the configuration information indicates a window size range of the time domain window or a window size range of the frequency domain window.

11. The apparatus according to claim 1, wherein the programming instructions to receive the indication information on the second sidelink transmission channel comprise programming instructions that, when executed by the at least one processor, further cause the apparatus to:

receive first signaling on the second sidelink transmission channel, wherein the first signaling comprises the indication information and second information, and the second information comprises acknowledgement (ACK) information or negative acknowledgement (NACK) information; or receive second signaling and third signaling on the second sidelink transmission channel, wherein the second signaling comprises the indication information, and the third signaling comprises ACK information or NACK information.

12. The apparatus according to claim 1, wherein the first sidelink transmission channel is a physical sidelink shared channel (PSSCH), and the second sidelink transmission channel is a physical sidelink feedback channel (PSFCH).

13. An apparatus, comprising:

at least one processor; and a memory coupled to the at least one processor and configured to store programming instructions that, when executed by the at least one processor, cause the apparatus to:

receive first resource information on a first sidelink transmission channel, wherein the first resource information indicates at least one first resource, wherein the first resource information is carried in a plurality of sidelink control information (SCI) stages on the first sidelink transmission channel, the plurality of SCI stages including a first stage and a second stage, wherein a quantity of bits occupied by the second stage is determined based on a first quantity indicated by the first stage, and wherein the second stage includes time domain resource information and frequency domain resource information of the at least one first resource; and send indication information indicating at least one second resource in the at least one first resource on a second sidelink transmission channel or send data on a third resource determined based on the at least one first resource.

14. The apparatus according to claim 13, wherein the indication information comprises a code domain resource, and the code domain resource corresponds to the at least one second resource.

15. The apparatus according to claim 13, wherein an upper limit value of a quantity of the at least one first resource or the quantity of the at least one first resource is predefined in a protocol, or is preconfigured by using configuration information.

16. The apparatus according to claim 13, wherein:

the first quantity comprises a quantity of the at least one first resource; or the first quantity comprises a quantity of time domain windows that corresponds to the at least one first resource, a quantity of frequency domain windows that corresponds to the at least one first resource, a quantity that is of first bitmaps indicating time domain resources and that corresponds to the at least one first resource, or a quantity that is of second bitmaps indicating frequency domain resources and that corresponds to the at least one first resource.

17. The apparatus according to claim 16, wherein the first stage is first-stage SCI, and the second stage is second-stage SCI.

18. The apparatus according to claim 16, wherein the first stage is second-stage SCI, the second stage is third-stage SCI.

19. The apparatus according to claim 13, wherein the time domain resource information indicates a time domain resource corresponding to the at least one first resource, and wherein the frequency domain resource information indicates a frequency domain resource corresponding to the at least one first resource.

* * * * *